(12) United States Patent
Oba et al.

(10) Patent No.: US 10,785,244 B2
(45) Date of Patent: Sep. 22, 2020

(54) ANOMALY DETECTION METHOD, LEARNING METHOD, ANOMALY DETECTION DEVICE, AND LEARNING DEVICE

(71) Applicant: Panasonic Intellectual Property Corporation of America, Torrance, CA (US)

(72) Inventors: Tatsumi Oba, Osaka (JP); Iku Ohama, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 140 days.

(21) Appl. No.: 16/218,975

(22) Filed: Dec. 13, 2018

(65) Prior Publication Data
US 2019/0190938 A1 Jun. 20, 2019

Related U.S. Application Data

(60) Provisional application No. 62/599,265, filed on Dec. 15, 2017.

(30) Foreign Application Priority Data

Jun. 20, 2018 (JP) .................................. 2018-117398

(51) Int. Cl.
| H04L 29/06 | (2006.01) |
| G06F 21/56 | (2013.01) |
| H04L 12/26 | (2006.01) |
| H04L 12/24 | (2006.01) |
| G06N 20/00 | (2019.01) |

(52) U.S. Cl.
CPC ...... *H04L 63/1425* (2013.01); *H04L 41/0631* (2013.01); *H04L 41/16* (2013.01); *H04L 43/04* (2013.01); *H04L 43/062* (2013.01); *H04L 43/0876* (2013.01); *H04L 43/16* (2013.01); *H04L 63/1416* (2013.01); *G06N 20/00* (2019.01)

(58) Field of Classification Search
CPC .......... H04L 63/14; H04L 29/06; G06F 21/56
USPC .......... 713/187, 188, 189; 726/22, 23, 24, 25
See application file for complete search history.

(56) References Cited

U.S. PATENT DOCUMENTS

10,459,827 B1 * 10/2019 Aghdaie ............. G06F 11/0766
2009/0024555 A1 1/2009 Rieck et al.

FOREIGN PATENT DOCUMENTS

| EP | 3223486 A2 * | 9/2017 | .......... H04L 63/145 |
| JP | 2009-523270 | 6/2009 | |
| WO | 2007/131545 | 11/2007 | |

* cited by examiner

*Primary Examiner* — Izunna Okeke
(74) *Attorney, Agent, or Firm* — Wenderoth, Lind & Ponack, L.L.P.

(57) ABSTRACT

An anomaly detection method includes: extracting, for each of a plurality of learning packets obtained, all possible combinations of N-grams in the payload included in the learning packet; counting a first number which is the number of occurrences of each combination in the payloads of the learning packets; calculating, as anomaly detection models, first probabilities by performing smoothing processing based on a plurality of the first numbers; and when the score calculated for each of a plurality of packets exceeds a predetermined threshold that is based on the anomaly detection models stored in a memory, outputting information indicating that the packet having the score has an anomaly.

12 Claims, 14 Drawing Sheets

FIG. 5

| MODEL ID | DESTINATION IP | DESTINATION PORT | DATA FROM WHICH N-GRAMS ARE OBTAINED | THE NUMBER OF OCCURRENCES OF N-GRAMS | PROBABILITY OF OCCURRENCE OF N-GRAMS |
|---|---|---|---|---|---|
| 1 | 192.168.0.1 | 21 | TCP PAYLOAD | $n_1$[00:51 times, 01:12 times, ..., FF:31 times] | $Pr_1$[00:0.1, 01:0.02, ..., FF:0.06] |
| 2 | 192.168.0.1 | 44818 | TCP PAYLOAD | $n_2$[00:28 times, 01:19 times, ..., FF:5 times] | $Pr_2$[00:0.06, 01:0.04, ..., FF:0.01] |
| 3 | 192.168.0.2 | 44818 | TCP PAYLOAD | $n_3$[00:35 times, 01:24 times, ..., FF:15 times] | $Pr_3$[00:0.07, 01:0.05, ..., FF:0.03] |
| 4 | 192.168.0.3 | 80 | TCP PAYLOAD | $n_4$[00:14 times, 01:55 times, ..., FF:8 times] | $Pr_4$[00:0.03, 01:0.11, ..., FF:0.02] |
| 5 | 192.168.1.1 | 47809 | BACnet APDU | $n_5$[00:23 times, 01:71 times, ..., FF:17 times] | $Pr_5$[00:0.05, 01:0.14, ..., FF:0.03] |
| 6 | 192.168.2.1 | 502 | MODBUS PDU | $n_6$[00:86 times, 01:35 times, ..., FF:13 times] | $Pr_6$[00:0.17, 01:0.07, ..., FF:0.03] |

| MODEL ID | DESTINATION IP | SOURCE IP | DESTINATION PORT | DATA FROM WHICH N-GRAMS ARE OBTAINED | THE NUMBER OF OCCURRENCES OF N-GRAMS | PROBABILITY OF OCCURRENCE OF N-GRAMS |
|---|---|---|---|---|---|---|
| 1 | 192.168.0.1 | 192.168.1.1 | 21 | TCP PAYLOAD | $n_1$[00:51 times, 01:12 times, ..., FF:31 times] | $Pr_1$[00:0.1, 01:0.02, ..., FF:0.06] |
| 2 | 192.168.0.1 | 192.168.0.5 | 44818 | TCP PAYLOAD | $n_2$[00:28 times, 01:19 times, ..., FF:5 times] | $Pr_2$[00:0.06, 01:0.04, ..., FF:0.01] |
| 3 | 192.168.0.2 | 192.168.0.5 | 44818 | TCP PAYLOAD | $n_3$[00:35 times, 01:24 times, ..., FF:15 times] | $Pr_3$[00:0.07, 01:0.05, ..., FF:0.03] |
| 4 | 192.168.0.3 | 192.168.1.2 | 80 | TCP PAYLOAD | $n_4$[00:14 times, 01:55 times, ..., FF:8 times] | $Pr_4$[00:0.03, 01:0.11, ..., FF:0.02] |
| 5 | 192.168.1.1 | 192.168.1.10 | 47809 | BACnet APDU | $n_5$[00:23 times, 01:71 times, ..., FF:17 times] | $Pr_5$[00:0.05, 01:0.14, ..., FF:0.03] |
| 6 | 192.168.2.1 | 192.168.2.10 | 502 | MODBUS PDU | $n_6$[00:86 times, 01:35 times, ..., FF:13 times] | $Pr_6$[00:0.17, 01:0.07, ..., FF:0.03] |

FIG. 7

| MODEL ID | DESTINATION IP | SOURCE IP | TARGET PROTOCOL | DATA FROM WHICH N-GRAMS ARE OBTAINED | THE NUMBER OF OCCURRENCES OF N-GRAMS | PROBABILITY OF OCCURRENCE OF N-GRAMS |
|---|---|---|---|---|---|---|
| 1 | 192.168.0.1 | 192.168.1.1 | FTP-DATA | TCP PAYLOAD | $n_1$[00:51 times, 01:12 times, ..., FF:31 times] | $Pr_1$[00:0.1, 01:0.02, ..., FF:0.06] |
| 2 | 192.168.0.1 | 192.168.0.5 | ETHERNET/IP | TCP PAYLOAD | $n_2$[00:28 times, 01:19 times, ..., FF:5 times] | $Pr_2$[00:0.06, 01:0.04, ..., FF:0.01] |
| 3 | 192.168.0.2 | 192.168.0.5 | ETHERNET/IP | TCP PAYLOAD | $n_3$[00:35 times, 01:24 times, ..., FF:15 times] | $Pr_3$[00:0.07, 01:0.05, ..., FF:0.03] |
| 4 | 192.168.0.3 | 192.168.1.2 | HTTP | TCP PAYLOAD | $n_4$[00:14 times, 01:55 times, ..., FF:8 times] | $Pr_4$[00:0.03, 01:0.11, ..., FF:0.02] |
| 5 | 192.168.1.1 | 192.168.1.10 | BACnet | BACnet APDU | $n_5$[00:23 times, 01:71 times, ..., FF:17 times] | $Pr_5$[00:0.05, 01:0.14, ..., FF:0.03] |
| 6 | 192.168.2.1 | 192.168.2.10 | MODBUS/TCP | MODBUS PDU | $n_6$[00:86 times, 01:35 times, ..., FF:13 times] | $Pr_6$[00:0.17, 01:0.07, ..., FF:0.03] |

| MODEL ID | DESTINATION IP | DESTINATION PORT | DATA FROM WHICH N-GRAMS ARE OBTAINED | THE NUMBER OF OCCURRENCES OF N-GRAMS | PROBABILITY OF OCCURRENCE OF N-GRAMS | ALERT THRESHOLD |
|---|---|---|---|---|---|---|
| 1 | 192.168.0.1 | 21 | TCP PAYLOAD | $n_1$[00:51 times, 01:12 times, ..., FF:31 times] | $Pr_1$[00:0.1, 01:0.02, ..., FF:0.06] | 7.5 |
| 2 | 192.168.0.1 | 44818 | TCP PAYLOAD | $n_2$[00:28 times, 01:19 times, ..., FF:5 times] | $Pr_2$[00:0.06, 01:0.04, ..., FF:0.01] | 10.2 |
| 3 | 192.168.0.2 | 44818 | TCP PAYLOAD | $n_3$[00:35 times, 01:24 times, ..., FF:15 times] | $Pr_3$[00:0.07, 01:0.05, ..., FF:0.03] | 8.1 |
| 4 | 192.168.0.3 | 80 | TCP PAYLOAD | $n_4$[00:14 times, 01:55 times, ..., FF:8 times] | $Pr_4$[00:0.03, 01:0.11, ..., FF:0.02] | 3.5 |
| 5 | 192.168.1.1 | 47809 | BACnet APDU | $n_5$[00:23 times, 01:71 times, ..., FF:17 times] | $Pr_5$[00:0.05, 01:0.14, ..., FF:0.03] | 5.9 |
| 6 | 192.168.2.1 | 502 | MODBUS PDU | $n_6$[00:86 times, 01:35 times, ..., FF:13 times] | $Pr_6$[00:0.17, 01:0.07, ..., FF:0.03] | 10.9 |

| DESTINATION PORT | ALERT THRESHOLD |
|---|---|
| 21 | 7.5 |
| 44818 | 10.2 |
| 80 | 3.5 |
| 47809 | 5.9 |
| 502 | 10.9 |

ANOMALY DETECTION METHOD, LEARNING METHOD, ANOMALY DETECTION DEVICE, AND LEARNING DEVICE

CROSS REFERENCE TO RELATED APPLICATION

This application claims the benefit of priority of Japanese Patent Application Number 2018-117398 filed on Jun. 20, 2018, and U.S. Provisional Patent Application No. 62/599,265 filed on Dec. 15, 2017, the entire content of which is hereby incorporated by reference.

BACKGROUND

1. Technical Field

The present disclosure relates to an anomaly detection method and an anomaly detection device which detect anomalies in a plurality of packets by using learning models, and a learning method and a learning device which learn the learning models.

2. Description of the Related Art

Japanese Unexamined Patent Application Publication (Translation of PCT Application) No. 2009-523270 discloses a method for detecting anomalies in data using N-grams.

SUMMARY

The present disclosure provides, for example, an anomaly detection method which can accurately identify anomalous packets, and a learning method for learning anomaly detection models for the accurate identification.

An anomaly detection method according to one aspect of the present disclosure is an anomaly detection method executed by an anomaly detection device which detects whether or not an anomaly is present in one of a communication within a monitoring target and a communication between the monitoring target and a network to which the monitoring target is connected. The anomaly detection device includes a processor and a memory. The memory stores an anomaly detection model generated by learning using a plurality of learning packets. The anomaly detection method includes the following executed by the processor: obtaining the plurality of learning packets; extracting, for each of the plurality of learning packets obtained, first combinations of N data units out of a plurality of data units obtained by dividing a data sequence forming a payload included in the learning packet by A bit unit, the first combinations being all possible combinations of the N data units, the N data units being in a successive sequential order in the payload or being spaced B data unit apart in the payload, N being an integer greater than or equal to two, A being an integer greater than or equal to one, B being an integer greater than or equal to one; counting a first number for each of the first combinations extracted for the plurality of learning packets, the first number being the number of occurrences of the first combination in the plurality of learning packets; calculating a plurality of first probabilities each for a different one of the first combinations extracted, based on a plurality of the first numbers obtained by the counting, the plurality of first probabilities each being a probability of an occurrence of each of the first combinations in the plurality of learning packets, the plurality of first probabilities being calculated by performing smoothing processing; storing the plurality of first probabilities calculated, in the memory as the anomaly detection model; obtaining a plurality of packets; and when a score calculated for each of the plurality of packets obtained exceeds a predetermined threshold that is based on the anomaly detection model stored in the memory, outputting information indicating that the packet having the score exceeding the predetermined threshold has an anomaly.

Moreover, a learning method according to one aspect of the present disclosure is a learning method executed by a learning device which learns an anomaly detection model for detecting whether or not an anomaly is present in one of a communication within a monitoring target and a communication between the monitoring target and a network to which the monitoring target is connected. The learning device includes a processor and a memory. The learning method includes the following executed by the processor: obtaining a plurality of learning packets; extracting, for each of the plurality of learning packets obtained, first combinations of N data units out of a plurality of data units obtained by dividing a data sequence forming a payload included in the learning packet by A bit unit, the first combinations being all possible combinations of the N data units, the N data units being in a successive sequential order in the payload or being spaced B data unit apart in the payload, N being an integer greater than or equal to two, A being an integer greater than or equal to one, B being an integer greater than or equal to one; counting a first number for each of the first combinations extracted for the plurality of learning packets, the first number being the number of occurrences of the first combination in the plurality of learning packets; calculating a plurality of first probabilities each for a different one of the first combinations extracted, based on a plurality of the first numbers obtained by the counting, the plurality of first probabilities each being a probability of an occurrence of each of the first combinations in the plurality of learning packets, the plurality of first probabilities being calculated by performing smoothing processing; and storing the plurality of first probabilities calculated, in the memory as the anomaly detection model.

It should be noted that these general and specific aspects may be implemented using a system, a device, an integrated circuit, a computer program, or a computer-readable recording medium such as a CD-ROM, or any combination of systems, devices, integrated circuits, computer programs, or recording media.

With use of the anomaly detection method, the learning method, the anomaly detection device, and the learning device according to the present disclosure, it is possible to accurately identify anomalous packets.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 5 illustrates an example of anomaly detection models held in an anomaly detection model database (DB);

FIG. 6 illustrates another example of the anomaly detection models held in the anomaly detection model DB;

FIG. 7 illustrates another example of the anomaly detection models held in the anomaly detection model DB;

FIG. 8 illustrates another example of the anomaly detection models held in the anomaly detection model DB;

FIG. 9 illustrates correspondence information in which destination ports and alert thresholds are associated with each other;

Figure 1:
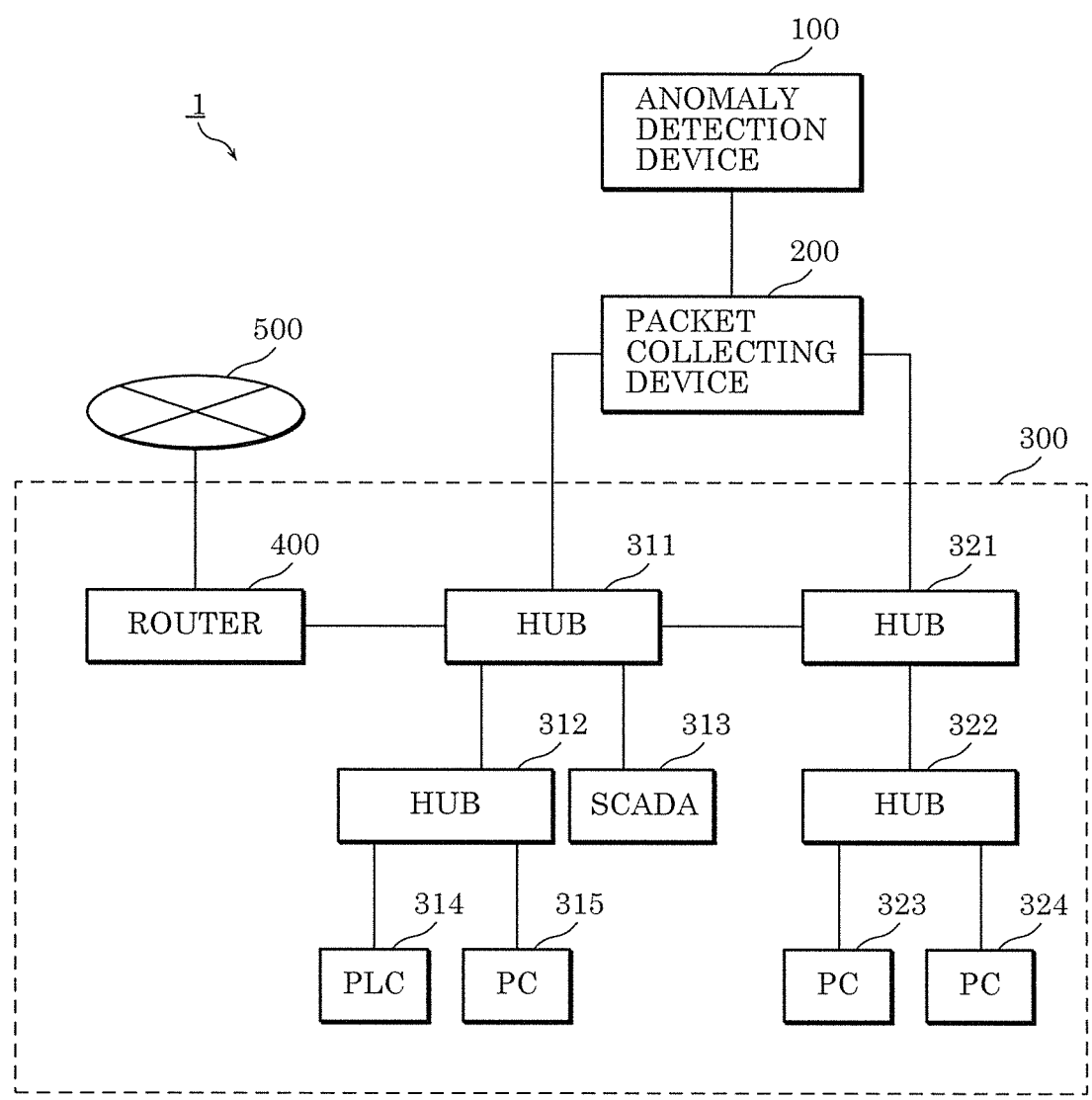
FIG. 1 schematically illustrates an anomaly detection system according to an embodiment.

DETAILED DESCRIPTION OF THE EMBODIMENT (Underlying Knowledge Forming Basis of the Present Disclosure)

[1-1 Background]

In recent years, threat of cyber attacks against control systems (such as factories, plants, and critical infrastructure) has increased, and damage caused by the cyber attacks has been on the increase. The following points have been suggested as the reasons for the increase in damage on the control systems as described above.

(1) In order to increase the reliability and the convenience of control, systems including the control systems are now interconnected. This has caused the control systems to be externally exposed, which is considered as a factor for an increased threat against the cyber security.

(2) In order to increase the interconnectivity and versatility of the systems, the internal network of the control systems now use communications using open protocols such as Modbus, EtherCAT, or BACnet. This is considered to have dramatically increased the possibility of attacks such as malware infection of the control systems.

(3) Control systems often do not have security measures implemented, and often use a single system over a few decades. Accordingly, in such control systems, it is common that support for the OS and the like ends during the period of use and security patches cannot be applied to PC terminals, or that antivirus software cannot be implemented.

Since the industrial advantages of (1) and (2) above are significantly large, those trends are considered to continue increasing more and more in the future. The present disclosure focuses on network level intrusion detection techniques to ensure the security of the control systems which cannot easily implement security measures or cannot easily change equipment as described in (3) above. Network-based intrusion detection system (NIDS) is a system for passively monitoring a target network, and no direct change needs to be made to equipment. NIDS thus has an advantage in that it is easily implemented in control systems which value availability.

[1-1-1 Types and Characteristics of Intrusion Detection System]

An intrusion detection system (IDS) is generally classified into host-based intrusion detection system (HIDS) and NIDS. In control systems, NIDS is generally used. A beneficial aspect in the use of NIDS in a control system is that no direct change needs to be made to production equipment. NIDS can be implemented independently of the OS, resources, or the like of the control device serving as a monitoring target. In contrast, in HIDS such as a virus detection software, a heavy load is imposed on a terminal at the time of virus scanning, which leads to a reduction in processing speed of the software related to production. This might influence the production activities.

Moreover, NIDS is further roughly classified into a signature/rule based method and an anomaly based method. Anomaly based NIDS is further classified into flow based and payload based. In general, signature/rule based NIDS is often used. In signature/rule based NIDS, an alert is generated when a specific byte sequence pattern included in a payload is found or when the traffic exceeds a predetermined threshold. In flow-based NIDS, only the packet headers are observed. A steady state model of flow information, such as the traffic size, cycle and the like in the network, is generated, and an alert is generated when traffic deviating from the steady state is detected. Since only the packet header information is used in the flow-based NIDS, anomalies can also be detected in encrypted communication or communication which does not involve payloads. In contrast, in payload-based NIDS, packet payload information is observed, and whether or not the payload is deviating from normal communication content is determined. Flow-based NIDS may respond sensitively to state changes which are not intended to be detected, such as system maintenance or non-steady file transfer. In contrast, payload-based NIDS does not have such a problem, and may be able to detect carefully crafted attacks which are not reflected in the flow information.

[1-1-2 Brief Outline and Advantageous Effects of Present Disclosure]

In the present disclosure, a new payload-based anomaly detection method will be described. The anomaly detection method according to the present disclosure adopts the payload-based anomaly detection technique for the reasons described below.

(i) In the environment where a control system is used, many operations are automated. However, in the control system, many non-steady operations are made when operations are made by humans, maintenance is carried out, products to be produced are changed, and the like. Flow-based NIDS may often detect such non-steady operations. In contrast, payload-based NIDS has an advantage in that false detection can be avoided as long as the operation content itself has universality.

(ii) In the case of carefully crafted malware, when a smart attack which does not appear in flow information is launched, the control system may not be able to detect packet anomalies if the packet payloads are not monitored.

(iii) Flow-based NIDS cannot detect an anomaly caused when a malicious regular operator operates the control system, or an anomaly caused when a regular operator inputs an anomalous parameter by mistake, because the flow itself matches the normal flow. Payload-based NIDS can also detect such anomalies.

The anomaly detection method and the like according to the present disclosure produce the advantageous effects as described below.

(i) The anomaly detection method according to the present disclosure can achieve high performance (low false detection rate, high detection rate) by using N-gram information of the packet payloads.

(ii) The anomaly detection method according to the present disclosure does not require tuning to be performed according to the deployment environment, and is suitable for automatically configuring an anomaly detection system even in a vast network environment.

(iii) The anomaly detection method according to the present disclosure can exhibit excellent performance in anomaly detection of FTP protocol and TEL-NET protocol of the 1999 DARPA IDS Data Set when compared with PAYL and ANAGRAM which are existing methods which require relatively small amounts of tuning.

[1-2 Fundamental Techniques]

Before describing the anomaly detection method according to the present disclosure, fundamental techniques used in the present disclosure will be described.

[1-2-1 N-Gram]

An N-gram is a contiguous sequence of N items in sequential data composed of elements such as given letters or words. For example, when a sequence of . . . AGCT-TCGA. . . is given in a DNA base sequence, 1-grams occurring in the sequence are . . . , A, G, C, T, T, C, G, A, . . . , 2-grams occurring in the sequence are . . . , AG, GC, CT, TT, TC, CG, GA, . . . , and 3-grams occurring in the sequence are, AGC, GCT, CTT, TTC, TCG, CGA, . . . . For example, when a sequence of . . . to be or not to be. . . occurs in a text, assuming that each element is a word, 1-grams occurring in the sequence are . . . , to, be, or, not, to, be, . . . , 2-grams occurring in the sequence are . . . , to be, be or, or not, not to, to be, . . . , and 3-grains occurring in the sequence are . . . , to be or, be or not, or not to, not to be, . . . .

For example, with the use of N-grams, feature extraction can be performed on the sequential data by simply vectorizing the number of occurrences of N-grams. Given that M represents the number of possible values of each element in given sequential data and L represents the length of the sequential data, there are $M^L$ possible patterns of the sequential data. However, by using the number of occurrences of 2-grams as a feature, for example, the sequential data can be treated as $M^2$-dimensional vector, which makes the sequential data easy to handle. Although N-grams are often used in the field of natural language processing or biological science, past studies have shown that N-grams are also effective in payload anomaly detection.

[1-2-2 Sequence Generative Model Using N-Grams]

As described above, N-grams are models useful in handling sequence information. The use of N-grams allows construction of very simple sequence generative models. The sequence generative models using N-grams are handled with $Pr(x_i|x_{i-(n-1)}, \ldots, x_{i-1})$. In other words, it is assumed that the probability that a given element is output is determined only by the immediately preceding N−1 element. Of course, this assumption is incorrect in most cases. However, it is convenient in that, for example, when a sequence is given, likelihood of the occurrence of the sequence can be obtained. For example, given that $x_1, x_2, \ldots, x_l$ is the target sequence data, the probability that the data is generated is represented by $Pr(x_1, x_2, \ldots, x_l)$. In the generative model using 2-grams, it can be divided into products of probabilities as below.

$$Pr(x_1, x_2, \ldots, x_l) \quad \text{(Formula 1)}$$

$$= Pr(x_1) \cdot Pr(x_2|x_1) \cdot Pr(x_3|x_1, x_2)$$

$$\ldots Pr(x_l|x_1, x_2, \ldots, x_{l-1}) \quad \text{(Formula 2)}$$

$$= Pr(x_1|\text{start}) \cdot Pr(x_2|x_1) \cdot Pr(x_3|x_2)$$

$$\ldots Pr(x_l|x_{l-1}) \quad \text{(Formula 3)}$$

The probability of occurrence of $x_1$ in the beginning is used only for calculating the probability of occurrence of the initial element, and the property that the probability of occurrence of each subsequent letter depends only on the probability of occurrence of the immediately preceding element is used for calculating the probability of occurrence of each subsequent letter. In the simplest way, given that M is the number of possible elements, and $k_{x_i, x_j}$ is the number of occurrences of 2-grams $x_i$, $x_j$, the probabilities of the respective terms can be defined by Formula 4 below.

[Math 1]

$$Pr(x_i | x_{i-1}) = \frac{k_{x_{i-1}, x_i}}{\sum_{j=1}^{M} k_{x_j, x_i}} \quad \text{(Formula 4)}$$

The anomaly detection method according to the present disclosure is a method for detecting an anomalous payload sequence by performing modeling using N-grams in the byte sequences included in payloads. The anomaly detection method according to the present disclosure is superior to the conventional techniques in terms of high detection performance and ease of tuning.

[1-3 Existing Methods]

Figure 4A:
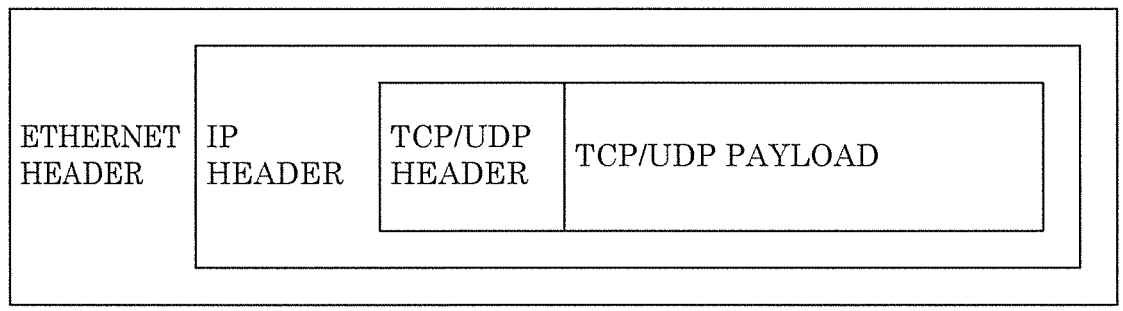
FIG. 4A illustrates a structure of an Ethernet frame.

Existing payload-based anomaly detection methods will be introduced. The anomaly detection methods which will be described here perform anomaly detection by using, for example, payloads of the transmission control protocol (TCP)/user datagram protocol (UDP) layer (the TCP/UDP payload portion of a packet having the structure illustrated in FIG. 4A). However, of course, the detection target is not limited to the protocol on TCP/UDP, but anomaly detection can also be performed by using payloads of another protocol in a similar manner. Moreover, each method does not require prior knowledge. In other words, operations, such as extraction of a specific element of a payload by using a protocol-specific parser, are not performed. Representative conventional examples which use N-grams for the payload-based anomaly detection method are PAYL, POSEIDON, and ANAGRAM as described below. Both PAYL and POSEIDON are examples where identification is performed using unigrams. ANAGRAM is an example where identification is performed using N-grams (N=3, 5, 7, and the like). Hereinafter, these three methods will be described in order.

[1-3-1 PAYL]

PAYL is a method which uses unigram information in payload sequences, and was proposed by Ke Wang et al. in 2004. In PAYL, anomaly detection models are separately learned for packet destination IP, packet destination port, and packet payload length (1-byte unit). In the learning phase, all the learning payload sequences are converted into 256 dimensional unigram vectors, and information of the mean of respective dimensions and standard deviations are accumulated. In the detection phase, too, the inspection target payload sequences are converted into 256 dimensional (1-byte) unigram vectors, and a simplified Mahalanobis distance between the converted vectors and the mean vector accumulated in the learning phase is calculated as an anomaly score. For calculation of the anomaly score, Formula 5 below is used.

[Math 2]

$$\text{score} = d(x, \overline{y}) = \sum_{i=0}^{255} \frac{|x_i - \overline{y}_i|}{\overline{\sigma}_i + \alpha} \quad \text{(Formula 5)}$$

where, $x_i$ is an i-th dimensional inspection target payload,
$\overline{y}_i$ is a learned i-th dimensional mean vector,
$\overline{\sigma}_i$ is a learned standard deviation vector, and
$\alpha$ is a very small positive value to avoid division by zero.

In an implementation of naïve PAYL, the only hyperparameter (parameter required to be defined by a human prior to learning) is $\alpha$ in the above formula, and thus, the necessity for tuning is low. Moreover, additional data learning can be easily performed. Although PAYL is a simple and highly effective identifier, information related to the sequential order is totally lost due to the property of using unigrams. This is considered to lead to worsening accuracy. Subsequently, in order to overcome the weakness of the use of unigrams, various methods using N-grams (N>2) have been devised.

In other words, a problem in PAYL is that the identification accuracy is slightly lower than the various methods proposed after PAYL, due to the use of unigrams.

[1-3-2 POSEIDON]

In PAYL, with the purpose of classifying the anomaly detection models according to the role of the packet, the models are classified according to the length of the packet payload. However, it was considered that there are cases where the models cannot be classified according to the role of the packet based on the payload length. Accordingly, in 2006, Damiano Bolzoni et al. proposed POSEIDON as a method which attempts to classify models by using different information. In POSEIDON, a distance scale between payloads is defined, packets close to each other as defined by the distance scale are clustered together, and the cluster information is used as information for classifying models instead of using the payload length. As a clustering method, a self-organizing map is used. Except for the use of the cluster information instead of the payload length, POSEIDON is the same anomaly detection method as PAYL. POSEIDON exhibits a high level of identification accuracy when an appropriate self-organizing map can be learned. However, the self-organizing map has an extremely large number of hyperparameters. Hence, POSEIDON has little practicability because tuning by many trials and cross-validations is required in POSEIDON so that packets are classified into preferable clusters.

In other words, POSEIDON has the following two problems. The first problem is that since a self-organizing map has many hyperparameters, tuning is extremely difficult. The second problem is that learning of the self-organizing map requires a lot of time and calculation resources, and thus, POSEIDON is unsuitable for use in a real environment.

[1-3-3 ANAGRAM]

ANAGRAM is a method proposed by Ke Wang et al. in 2006 to improve PAYL. The problem where PAYL is vulnerable to Mimicry Attacks (attacks attempting to avoid detection by models) had been pointed out. In order to overcome the problem, in ANAGRAM, N-gram modeling for larger N is performed. The paper introduces a frequency-based method which also uses the information of the number of occurrences of each N-gram, and a binary-based method which uses only the information of whether or not each N-gram has occurred. Of these two methods, it is considered that binary-based ANAGRAM has a higher accuracy because the sparsity of learning data is higher in binary-based ANAGRAM (hereinafter, when simply referred to as ANAGRAM, it refers to binary-based ANAGRAM). The amount of N-gram information increases exponentially relative to the magnitude of N. Hence, in ANAGRAM, N-gram information occurring in learning target payloads is held efficiently using a bloom filter. Although the bloom filter operates quickly and does not use a vast amount of memory, the filter size has to be predetermined according to the target data. Too small a filter size may lead to a false determination where an N-gram which was never observed was observed, and too large a filter size occupies a large amount of memory. Moreover, if a packet including a bad N-gram is observed even once, due to the property of ANAGRAM, when the N-gram appears in the subsequent packets, they are all considered as normal. This seriously reduces the accuracy. This becomes a problem, for example, when learning data includes an encrypted character string or a byte sequence which has high randomness such as a binary sequence of data. The anomaly score in binary-based ANAGRAM is calculated by Formula 6 below.

[Math 3]

$$\text{score} = \frac{N_{new}}{T} \in [0, 1] \quad \text{(Formula 6)}$$

where $N_{new}$ is a never-before-seen N-gram, and
T is the total number of N-grams in the payload.

In contrast, the anomaly score in frequency-based ANAGRAM is calculated by Formula 7 below.

[Math 4]

$$\text{score} = \frac{\sum_{i \in P} f(g_i)}{T} \in [0, 1] \quad \text{(Formula 7)}$$

where $t(g_i)$ is the number of occurrences of each N-gram $g_i$,
$f(g_i) = t(g_i)/\Sigma_i t(g_i)$ is the probability of occurrence of N-gram $g_i$,
P is a set of N-grams occurring in the target payload, and
T is the total number of N-grams in the target payload.

As understood from these formulae, both binary-based ANAGRAM and frequency-based ANAGRAM are very simple methods, and almost no hyperparameters exist, and thus, they are easy to handle.

In other words, frequency-based ANAGRAM and binary-based ANAGRAM have three problems described below.

The first problem is that since frequency information is lost in ANAGRAM, when N-grams of an abnormal packet are observed under the influence of a bad packet or a packet with high randomness, the accuracy is seriously reduced. The second problem is that when ANAGRAM is used for a large N which is approximately N≥4, the use of a bloom filter is absolutely necessary, which requires designing the size of the bloom filter. The third problem is that the function of the score calculation in frequency-based ANAGRAM is empirical, and there is no probabilistic validity.

Based on the above, as a result of diligent examination, the inventors of the present disclosure have arrived at the anomaly detection method, the learning method, the anomaly detection device, and the learning device which can accurately identify anomalous packets.

An anomaly detection method according to one aspect of the present disclosure is an anomaly detection method executed by an anomaly detection device which detects whether or not an anomaly is present in one of a communication within a monitoring target and a communication between the monitoring target and a network to which the monitoring target is connected. The anomaly detection device includes a processor and a memory. The memory stores an anomaly detection model generated by learning using a plurality of learning packets. The anomaly detection method includes the following executed by the processor: obtaining the plurality of learning packets; extracting, for each of the plurality of learning packets obtained, first combinations of N data units out of a plurality of data units obtained by dividing a data sequence forming a payload included in the learning packet by A bit unit, the first combinations being all possible combinations of the N data units, the N data units being in a successive sequential order in the payload or being spaced B data unit apart in the payload, N being an integer greater than or equal to two, A being an integer greater than or equal to one, B being an integer greater than or equal to one; counting a first number for each of the first combinations extracted for the plurality of learning packets, the first number being the number of occurrences of the first combination in the plurality of learning packets; calculating a plurality of first probabilities each for a different one of the first combinations extracted, based on a plurality of the first numbers obtained by the counting, the plurality of first probabilities each being a probability of an occurrence of each of the first combinations in the plurality of learning packets, the plurality of first probabilities being calculated by performing smoothing processing; storing the plurality of first probabilities calculated, in the memory as the anomaly detection model; obtaining a plurality of packets; and when a score calculated for each of the plurality of packets obtained exceeds a predetermined threshold that is based on the anomaly detection model stored in the memory, outputting information indicating that the packet having the score exceeding the predetermined threshold has an anomaly.

With this, the anomaly detection models are learned in view of sequential order information of data units in payloads, and thus, anomalous packets can be accurately identified.

Moreover, the first probabilities calculated by performing the smoothing processing are used in the learning, and thus, robustness against noise can be improved.

Moreover, it may be that, in the smoothing processing performed in the calculating of the plurality of first probabilities, a plurality of second numbers are calculated by adding a positive number to each of the plurality of first numbers, and the plurality of first probabilities are calculated based on the plurality of second numbers each calculated for a different one of the first combinations extracted.

Moreover, the first probabilities based on the second numbers calculated by adding a positive number to each of the first numbers are used in the learning. Hence, robustness against noise can be improved.

Moreover, it may be that in the extracting, the first combinations of the N data units are extracted by using an N-gram.

Moreover, it may be that N is one of two and three.

Moreover, it may be that in the outputting, for each of the plurality of packets obtained, (i) second combinations of N data units, out of a plurality of data units obtained by dividing a data sequence forming a payload included in the packet by A bit unit, are extracted, the second combinations being all possible combinations of the N data units, the N data units being in a successive sequential order in the payload or being spaced B data unit apart in the payload, (ii) a third number is counted for each of the second combinations extracted from the packet, the third number being the number of occurrences of the second combination in the payload included in the packet obtained, (iii) a plurality of second probabilities are calculated based on a plurality of the third numbers obtained by the counting for the second combinations in the packet, the plurality of second probabilities each being a probability of an occurrence of the second combination in the packet, (iv) the score is calculated by dividing a total sum of logarithms of the plurality of second probabilities calculated for the packet by a specified value specified by a payload length of the payload, and (v) when the score calculated for the packet exceeds the predetermined threshold that is based on the anomaly detection model stored in the memory, the information is output, the information indicating that the packet having the score exceeding the predetermined threshold has an anomaly.

With this, since scores are calculated in view of the sequential order information of data units in a payload, anomalous packets can be accurately identified.

Moreover, it may be that a fourth number based on the first number for each of the first combinations is stored in the memory as the anomaly detection model, and the anomaly detection method further includes updating the fourth number included in the anomaly detection model by using the third number counted.

Accordingly, it is possible to additionally learn anomaly detection models, or update anomaly detection models by deleting old data. Hence, it is possible to accurately identify anomalous packets.

Moreover, it may be that the anomaly detection method further includes: classifying each of the plurality of learning packets obtained into any one of a plurality of models according to a header of the learning packet; for each of the plurality of models, (i) calculating a fifth number by using the first number counted, the fifth number being the number of occurrences of each of the first combinations in a plurality of learning packets classified into the model out of the plurality of learning packets obtained; (ii) calculating a plurality of sixth numbers each for a different one of the first combinations extracted from the plurality of learning packets classified into the model, the plurality of sixth numbers being calculated by adding a positive number to each of a plurality of the fifth numbers calculated,; and (iii) calculating the plurality of first probabilities for the first combinations extracted, based on the plurality of sixth numbers calculated, the plurality of first probabilities each being a probability of an occurrence of each of the first combinations in the plurality of learning packets classified into the model.

Moreover, it may be that the memory stores the predetermined threshold for each of the plurality of models, the anomaly detection method further includes classifying each of the plurality of packets obtained into any one of the plurality of models according to a header of the packet, and in the outputting, the information, indicating that the packet has an anomaly, is output when the score calculated exceeds the predetermined threshold corresponding to the model into which the packet for which the score has been calculated is classified.

Moreover, it may be that each of the plurality of models is a model classified by at least one of a destination internet protocol (IP), a destination port, a source IP, and a protocol of the packet.

Moreover, it may be that the memory stores, as the anomaly detection model, the fifth number for each of the first combinations in each of the plurality of models, and the anomaly detection method further includes updating the fifth number included in the anomaly detection model by using the third number counted.

A learning method according to one aspect of the present disclosure is a learning method executed by a learning device which learns an anomaly detection model for detecting whether or not an anomaly is present in one of a communication within a monitoring target and a communication between the monitoring target and a network to which the monitoring target is connected. The learning device includes a processor and a memory. The learning method includes the following executed by the processor: obtaining a plurality of learning packets; extracting, for each of the plurality of learning packets obtained, first combinations of N data units out of a plurality of data units obtained by dividing a data sequence forming a payload included in the learning packet by A bit unit, the first combinations being all possible combinations of the N data units, the N data units being in a successive sequential order in the payload or being spaced B data unit apart in the payload, N being an integer greater than or equal to two, A being an integer greater than or equal to one, B being an integer greater than or equal to one; counting a first number for each of the first combinations extracted for the plurality of learning packets, the first number being the number of occurrences of the first combination in the plurality of learning packets; and calculating a plurality of first probabilities each for a different one of the first combinations extracted, based on a plurality of the first numbers obtained by the counting, the plurality of first probabilities each being a probability of an occurrence of each of the first combinations in the plurality of learning packets, the plurality of first probabilities being calculated by performing smoothing processing; and storing the plurality of first probabilities calculated, in the memory as the anomaly detection model.

With this, anomaly detection models are learned in view of the sequential order information of data units in payloads, and thus, anomalous packets can be accurately identified.

Moreover, the first probabilities based on the first numbers calculated by adding a positive number to each of the first numbers are used in the learning. Hence, robustness against noise can be improved.

It is to be noted that general and specific aspects disclosed above may be implemented using a system, a method, an integrated circuit, a computer program, or a computer-readable recording medium such as a CD-ROM, or any combination of systems, methods, integrated circuits, computer programs, or recording media.

Hereinafter, an anomaly detection method, a learning method, an anomaly detection device, and a learning device according to one aspect of the present disclosure will be specifically described with reference to the drawings.

Note that the embodiment described below shows one specific example of the present disclosure. The numerical values, shapes, materials, structural components, the arrangement and connection of the structural components, steps, the order of the steps etc. shown in the following embodiment are mere examples, and therefore do not limit the present disclosure. Moreover, among the structural components in the following embodiment, structural components not recited in any one of the independent claims defining the broadest concept are described as arbitrary structural components.

Embodiment 1

[2-1 Configuration of Anomaly Detection System]

First, a schematic configuration of an anomaly detection system according to the present embodiment will be described.

FIG. 1 is a schematic diagram of the anomaly detection system according to the present embodiment.

Specifically, in FIG. 1, anomaly detection system 1 includes anomaly detection device 100, packet collecting device 200, and monitoring target 300 communicatively connected to external network 500. In anomaly detection system 1, anomaly detection device 100 detects whether or not an anomaly is present in the communication within monitoring target 300 or the communication between monitoring target 300 and network 500.

Monitoring target 300 is a system subjected to anomaly detection. Monitoring target 300 is, for example, a chemical plant, a control system, or an in-vehicle network system. Monitoring target 300 is a control system which includes hubs 311, 312, 321, and 322, supervisory control and data acquisition (SCADA) 313, programmable logic controller (PLC) 314, personal computers (PC) 315, 323, and 324, and router 400.

Router 400 is a communication device which relays transmission and reception of data between monitoring target 300 and external network 500. Router 400 analyzes the received data, and performs data transfer control such as selecting a data transfer path based on the analyzed result.

Hubs 311 and 321 are, for example, switching hubs. Hub 311 is communicatively connected to router 400, hub 312, SCADA 313, hub 321, and packet collecting device 200. Hub 321 is communicatively connected to hub 311, hub 322 and packet collecting device 200. Hubs 311 and 321 transfer the received data to a device which is included in the connected devices and which is based on the destination information included in the received data. Hubs 311 and 321 each include a mirror port which, for example, copies the received data and outputs the copied data. Hubs 311 and 321 are connected to packet collecting device 200 at the mirror ports. A plurality of packets, transmitted and received between monitoring target 300 and external network 500, are extracted via the mirror ports of hubs 311 and 321 and transmitted to packet collecting device 200.

Hubs 312 and 322 are, for example, switching hubs. Hub 312 is communicatively connected to hub 311, PLC 314, and PC 315. Hub 322 is communicatively connected to hub 321, PC 323, and PC 324. In a similar manner to hubs 311 and 321, hubs 312 and 322 transfer the received data to a device which is included in the connected devices and which is based on the destination information included in the received data.

SCADA 313 is a computer which performs system monitoring, process control and the like on the control system which is monitoring target 300.

PLC 314 is a control device for controlling various types of machines.

PC 315 is a general-purpose computer.

Packet collecting device 200 is a device which receives the plurality of packets transmitted from hubs 311 and 321 of monitoring target 300, and stores the received packets. Packet collecting device 200 is, for example, a server. Packet collecting device 200 receives a plurality of packets from monitoring target 300 for a predetermined period such as one week, and stores the packets which were received for the predetermined period. Packet collecting device 200 transmits the stored packets to anomaly detection device 100. Packet collecting device 200 may also store a plurality of learning packets used by anomaly detection device 100 for generating anomaly detection models. The learning packets include normal packets with no anomaly.

[2-2 Configuration of Anomaly Detection Device]

Next, a hardware configuration of anomaly detection device 100 will be described with reference to FIG. 2.

Figure 2:
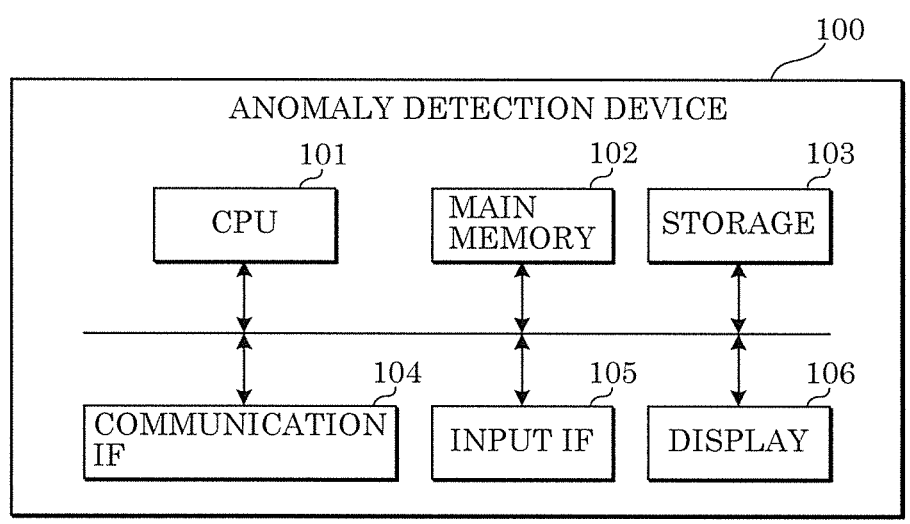
FIG. 2 is a block diagram illustrating an example of a hardware configuration of an anomaly detection device according to the embodiment.

FIG. 2 is a block diagram illustrating an example of a hardware configuration of the anomaly detection device according to the embodiment.

As illustrated in FIG. 2, anomaly detection device 100 includes, as a hardware configuration, central processing unit (CPU) 101, main memory 102, storage 103, communication interface (IF) 104, input IF 105, and display 106.

CPU 101 is an example of a processor which executes a control program stored in storage 103 or the like.

Main memory 102 is a volatile storage area used as a work area used when CPU 101 executes a control program. In other words, main memory 102 is an example of a memory.

Storage 103 is a non-volatile storage area which holds control programs, content, and the like. In other words, storage 103 is an example of a memory.

Communication IF 104 is a communication interface which communicates with packet collecting device 200 via a communication network. Communication IF 104 is, for example, a wired LAN interface. Note that communication IF 104 may be a wireless LAN interface. Moreover, communication IF 104 is not limited to LAN interfaces, but may be any communication interfaces as long as a communication connection can be established between communication IF 104 and packet collecting device 200.

Input IF 105 is an input device such as a numeric keypad, a keyboard, and a mouse.

Display 106 is a display device which displays the processing results of CPU 101. Display 106 is, for example, a liquid crystal display, or an organic electroluminescent (EL) display.

[2-3 Functional Configuration of Anomaly Detection Device]

Next, a functional configuration of anomaly detection device 100 will be described with reference to FIG. 3. Note that anomaly detection device 100 is also an example of a learning device which also performs learning processing of anomaly detection models for detecting anomalies.

Figure 3:
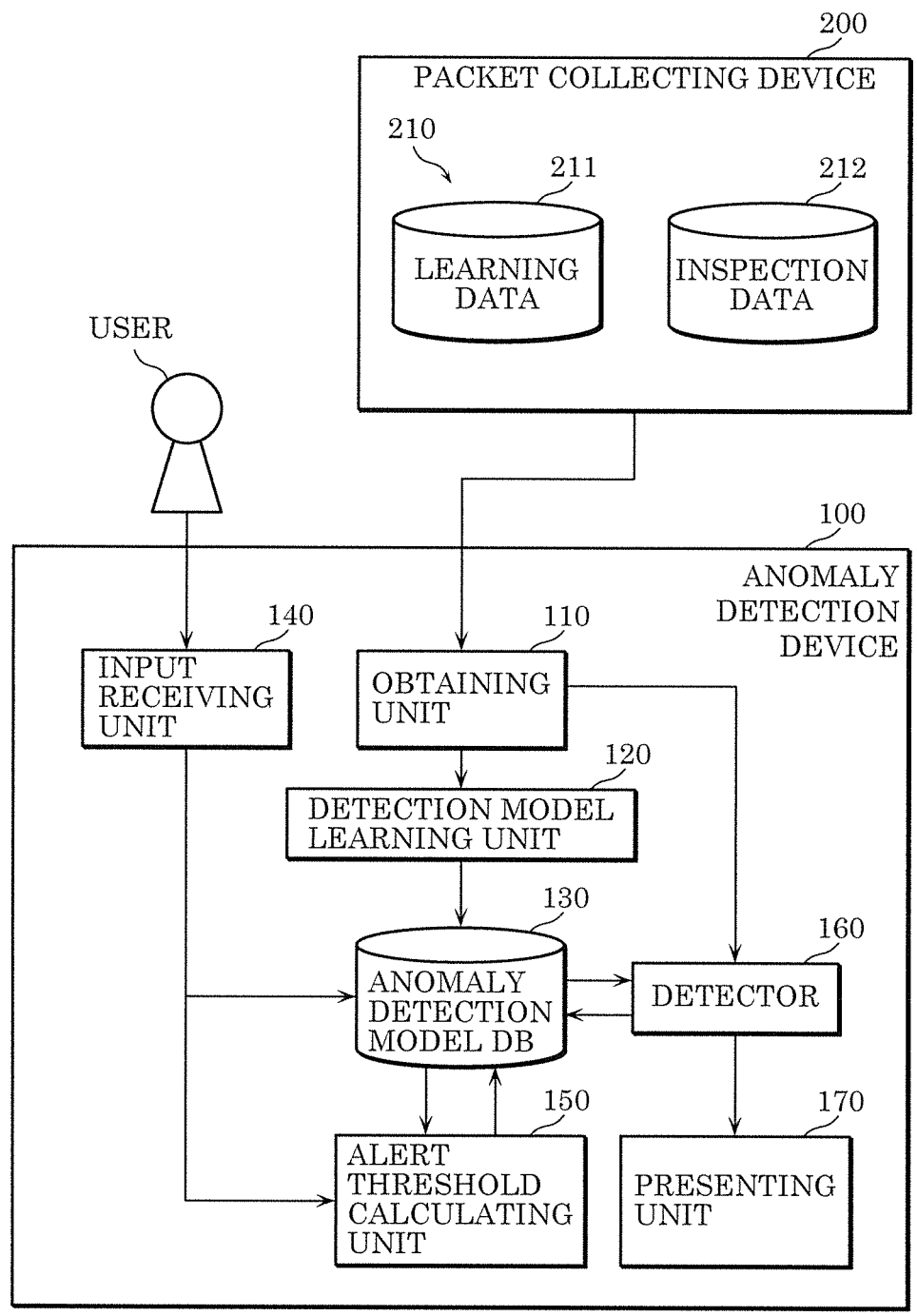
FIG. 3 is a block diagram illustrating an example of a functional configuration of the anomaly detection device according to the embodiment.

FIG. 3 is a block diagram illustrating an example of a functional configuration of the anomaly detection device according to the present embodiment.

Data 210 made of the packets stored in packet collecting device 200 includes learning data 211 and inspection data 212.

Learning data 211 is data, among the obtained data 210, for generating anomaly detection models for machine learning. Inspection data 212 is included in the obtained data 210, and is data subjected to anomaly diagnosis for determining whether or not data 210 obtained from monitoring target 300 is anomalous by using the generated anomaly detection models. Note that a plurality of obtained packets including not only normal data but also anomalous data can be used as learning data 211. For example, it may be that learning data 211 is data obtained for a first predetermined period of data 210, and inspection data 212 is data obtained in a period after the predetermined period during which learning data 211 was obtained. Moreover, inspection data 212 may be used as learning data for updating the anomaly detection models.

Figure 4B:
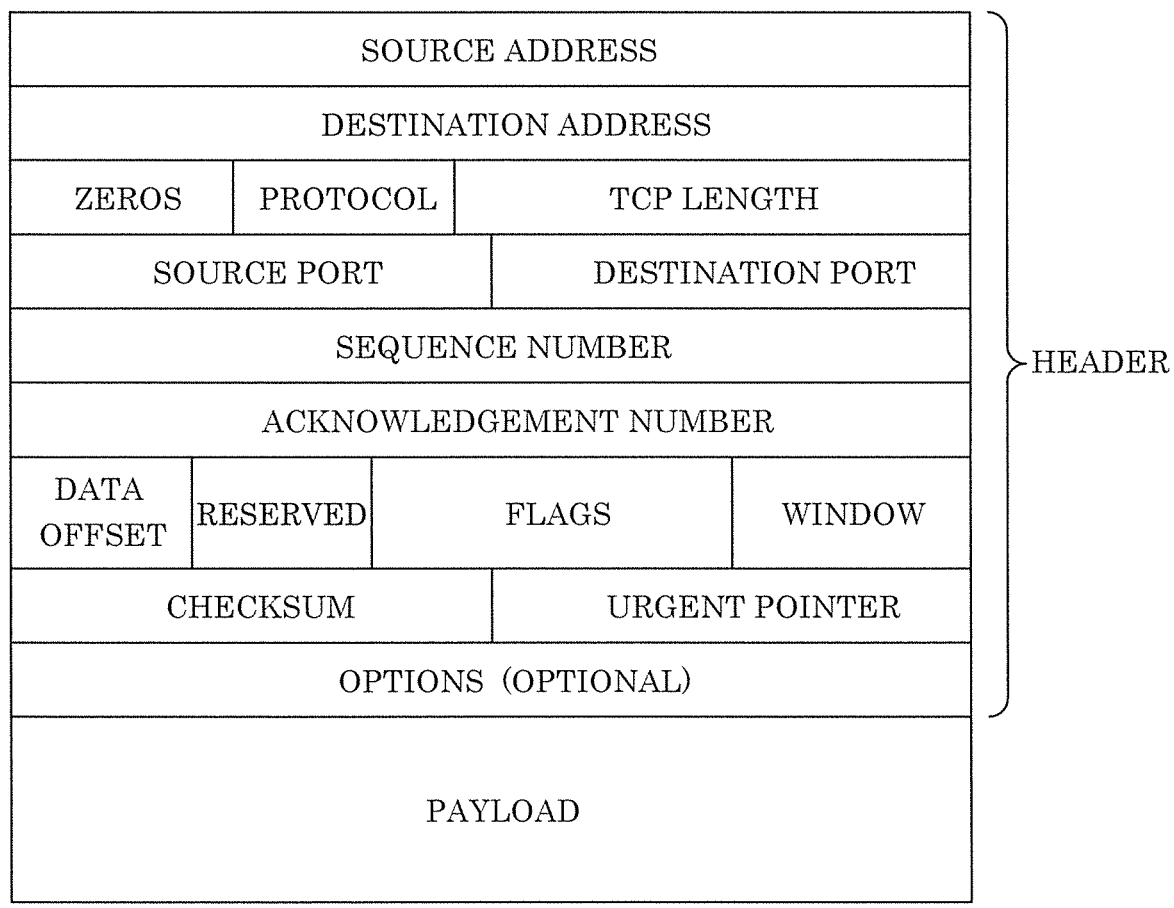
FIG. 4B illustrates an example of a structure of a TCP protocol packet.

Note that the plurality of packets each are, for example, a TCP protocol packet as illustrated in FIG. 4B. FIG. 4B illustrates an example of a structure of a TCP protocol packet. The structure of TCP protocol is defined in accordance with RFC793.

Anomaly detection device 100 includes obtaining unit 110, detection model learning unit 120, anomaly detection model database (DB) 130, input receiving unit 140, alert threshold calculating unit 150, detector 160, and presenting unit 170.

Obtaining unit 110 obtains, from packet collecting device 200, a plurality of learning packets which are a plurality of packets serving as learning data 211. Obtaining unit 110 may obtain, from packet collecting device 200, a plurality of packets serving as inspection data 212. Obtaining unit 110 is realized by, for example, CPU 101, main memory 102, storage 103, and communication IF 104.

Detection model learning unit 120 generates anomaly detection models by performing learning processing using the learning packets obtained by obtaining unit 110. Specifically, detection model learning unit 120 extracts, for each of the plurality of learning packets obtained by obtaining unit 110, all possible combinations of N data units (where N is an integer greater than or equal to two) out of a plurality of data units obtained by dividing a data sequence forming the payload included in the learning packet by A bit unit (where A is an integer greater than or equal to one). The combinations of N data units are in a successive sequential order in the payload. Here, the extracted combinations are one example of first combinations. Here, A bit unit is, for example, eight bit unit, that is, one byte unit. Note that A is not limited to eight, but may be a numerical value other than eight. Detection model learning unit 120 extracts the combinations of N data units by using N-grams. Here, N is, for example, two or three. In other words, detection model learning unit 120 extracts combinations of two data units by using 2-grams or extracts combinations of three data units by using 3-grams. Note that the combinations of N data units extracted by detection model learning unit 120 do not have to be in a successive sequential order like N-grams, but may be spaced B data unit apart (where B is an integer greater than or equal to one).

Next, detection model learning unit 120 counts a first number for each of the all possible combinations extracted from the data sequences forming the payloads of the learning packets obtained by obtaining unit 110. The first number is the number of occurrences of the combination in the learning packets. Detection model learning unit 120 calculates a plurality of second numbers each for a different one of the extracted combinations by adding a positive number to each of a plurality of the first numbers obtained by the counting. Detection model learning unit 120 calculates a plurality of first probabilities based on the plurality of second numbers calculated for the extracted combinations. The plurality of first probabilities each are a probability of occurrence of the first combination in the plurality of learning packets.

Although it has been described that detection model learning unit 120 calculates the plurality of second numbers by adding a positive number to each of the plurality of first numbers, and calculates the plurality of first probabilities based on the plurality of second numbers, the present disclosure is not limited to this example. It may be that detection model learning unit 120, for example, calculates, based on the plurality of first numbers each calculated for a different one of the extracted combinations, a plurality of probabilities each of which is the probability of occurrence of the extracted combination in the plurality of learning packets, and calculates the plurality of first probabilities by adding a positive number to each of the calculated probabilities.

It may be that detection model learning unit 120 further classifies each of the learning packets obtained by obtaining unit 110 into one of a plurality of models according to the header of the learning packet. Detection model learning unit 120 may hold or learn a plurality of anomaly detection models. In this case, detection model learning unit 120 performs learning or inspection processing by switching between the plurality of anomaly detection models according to at least one value of the destination IP, destination port, source IP, and protocol which are information included in the packet header, for example.

When the plurality of learning packets are classified into a plurality of models, detection model learning unit 120 may calculate, for each of the models, a fifth number by using the counted first number. The fifth number is the number of occurrences of each of the combinations in a plurality of learning packets classified into the model out of the plurality of learning packets obtained. For each of the plurality of models, detection model learning unit 120 then calculates a plurality of sixth numbers each for a different one of the combinations extracted from the plurality of learning packets classified into the model, by adding a positive number to each of the calculated fifth numbers. Subsequently, detection model learning unit 120 may calculate the first probabilities for the combinations extracted for each of the plurality of models, based on the calculated sixth numbers. The first probabilities each are a probability of occurrence of each of the combinations in the plurality of learning packets classified into the model.

Detection model learning unit 120 is realized by, for example, CPU 101, main memory 102, and storage 103.

For example, detection model learning unit 120 executes learning by performing processing as described below.

In the learning method of the anomaly detection method, models are classified according to packet destination IP and packet destination port. Hence, in the learning phase, models $$M_{(ip_i, port_j)}$$ [Math 5]

equal in number to unique pairs (destination IP and destination port) are initialized. Each model holds $$x_{i,j} \in N^{65536}$$ [Math 6]

which records 2-grams of the payloads. The initial value is 65536 dimensional zero vector. Subsequently, when the pair of destination IP and destination port of each of all target learning packets is ($ip_i$, $Port_j$), each of the target learning packets is converted into a 2-gram vector ($\in N^{65536}$) by the following method, and is added to $$x_{i,j} \in N^{65536}$$ [Math 7]

The method of converting each packet into a 2-gram vector is as follows: given that the byte sequence of the payload of the packet is $\{X_1, X_2, X_3, \ldots, X_L\}$ (L is the payload length). Here, it is satisfied that each $X_k$(k=1, ..., L)$\in\{0, \ldots, 255\}$. When 2-grams are obtained, the next 2-gram sequence is obtained from the above byte sequence. $\{X_1X_2, X_2X_3, \ldots, X_{L-1}X_L\}$. From this 2-gram sequence, a 2-gram vector is generated in accordance with the following rules.

1. Prepare empty vector y($\in N^{65536}$).
2. For each 2-gram $X_iX_{i+1}$(i=1, ..., L−1), $t_i$=256*$X_i$+$X_{i+1}$ is calculated. (ti$\in\{0, \ldots, 65535\}$).
3. For all of i=1, ..., L−1, y[$t_i$]+1 is executed (here, y[$t_i$] represents $t_i$-th element in vector y.
4. Result y of conversion of the packet into a 2-gram vector is obtained.

When learning of all the packets is completed, each model $$M_{(ip_i, port_j)}$$ [Math 8]

holds a following vector representing which 2-gram has occurred and how many times.

$$x_{(ip_i, port_j)} \in N^{65536}$$ [Math 9]

The vector representing how many times the 2-gram has occurred is an example of the first number obtained by counting for each of all the combinations. With use of the vector, the probability of occurrence of each 2-gram is calculated. In the simplest way, when an index of 2-gram is k$\in\{0,1, \ldots, 65535\}$, probability p($g_k$) of occurrence of 2-gram $g_k$ can be represented by following Formula 8 when the number of occurrences of 2-gram $g_k$ in target learning packets is $x_{i,j}$[k]. The probabilities of occurrences represented by Formula 8 are an example of the plurality of first probabilities.

[Math 10]

$$p(g_k) = \frac{x_{i,j}[k]}{\sum_{l=0}^{65535} x_{i,j}[l]} \quad \text{(Formula 8)}$$

However, when the probability is represented by the above formula, the probability of 2-gram never occurred in the target learning packets is considered as 0. This causes score divergence when the scoring method to be described later is used. In order to prevent this from happening, there are a few proposed methods. In the present embodiment, a method referred to as Laplace smoothing is used which is one of smoothing processing. Laplace smoothing is one type of method for smoothing categorical data. Given that there is data x=($x_1, \ldots, x_d$) obtained from a multinomial distribution with N trials, parameter $\theta$=($\theta_1, \ldots, \theta_d$) in the multinomial distribution is estimated by Formula 9 below in Laplace smoothing.

[Math 11]

$$\hat{\theta}_i = \frac{x_i + \alpha}{N + \alpha d} (i = 1, \ldots, d) \quad \text{(Formula 9)}$$

In other words, it corresponds to that Formula 10 is applied to each category after adding α times of occurrences to the number of occurrences $x_i$. Normally, α chooses a value of 1, 0.1, or 0.01, for example. When this method is applied to the learning method according to the present disclosure, the formula below is obtained. Here, α is an example of the positive number added.

[Math 12]

$$p(g_k) = \frac{x_{i,j}[k] + \alpha}{\sum_{l=0}^{65535} x_{i,j}[l] + 65536\alpha} \quad \text{(Formula 10)}$$

$(k = 0, \ldots, 65535)$

Here, $p(g_k)$ obtained from the above formula is considered as the probabilities of occurrences of 2-gram $g_k$. In other words, the probabilities of occurrences obtained by Formula 10 are an example of the first probabilities.

Note that the smoothing processing performed is not limited to Laplace smoothing, but other smoothing processing such as Kneser-Ney smoothing may be performed.

Anomaly detection model DB 130 stores, as anomaly detection models, a plurality of first probabilities generated, that is, calculated by anomaly model learning unit 120. Anomaly detection model DB 130 may store, as anomaly detection models, a fourth number based on the first number for each of all the first combinations. Note that the fourth number based on the first number stored in the anomaly detection models may be the first number, the second number, the fifth number, or the sixth number.

FIG. 5 to FIG. 8 each illustrate an example of the anomaly detection models held in the anomaly detection model DB.

Anomaly detection models 131 illustrated in FIG. 5 include data items of model ID, destination IP, destination port, data from which N-grams are obtained, the number of occurrences of N-grams, and probability of occurrence of N-grams. The model ID is an identifier uniquely assigned to each of a plurality of models for identification. The destination IP is information which indicates the destination IP of the packets associated with the model. The destination port is information which indicates the destination port of the packets associated with the model. The data from which N-grams are obtained is information which indicates data, from which N-grams are obtained, associated with the model. An example of the data from which N-grams are obtained is a payload indicating the data portion of a packet of each protocol. The number of occurrences of N-grams $n_1$ to $n_6$ indicates the number of occurrences of N-grams in the packets associated with the mode, that is, an example of the sixth number. The number of occurrences of N-grams $n_1$ to $n_6$ is represented by the number of occurrences of each of all N-grams, and thus, is vector data of the dimension corresponding to the number of all N-grams. In other words, $n_1$ is represented by, for example, [00:51 times, 01:12 times, . . . , FF:31 times]. Accordingly, $n_k$ (k is an integer from one to six) is represented by, for example, [$n_{k1}$, $n_{k2}$, . . . , $n_{kL}$]. The probability of occurrence of N-grams $Pr_1$ to $Pr_6$ indicates the probability of occurrence of N-grams in the packets associated with the model, that is, an example of the first probability. The probability of occurrence of N-grams $Pr_1$ to $Pr_6$ is also vector data of the dimension corresponding to the number of all N-grams, in a similar manner to the number of occurrences of N-grams $n_1$ to $n_6$. In other words, $Pr_1$ is represented by, for example, [00:0.1, 01:0.02, . . . , FF:00.6]. Accordingly, $Pr_k$ (k is an integer from one to six) is represented by, for example, {$Pr_{k1}$, $Pr_{k2}$, . . . , $Pr_{kL}$}. In this manner, in anomaly detection models 131, a plurality of models are classified according to the set of the destination IP and the destination port.

In other words, anomaly model learning unit 120 learns packets for each destination IP and each destination port, and generates the results of the learning as anomaly detection models 131. The anomaly detection models are learned in this way because packets with the same destination IP and the same destination port often have similar roles.

Anomaly detection models 132 illustrated in FIG. 6 include the item of source IP in addition to the items of anomaly detection models 131 illustrated in FIG. 5. The source IP is information which indicates the source IP of the packets associated with the model. In this manner, in anomaly detection models 132, a plurality of models are classified according to the set of the destination IP, the destination port, and the source IP.

Anomaly detection models 133 illustrated in FIG. 7 are models in which the item of the destination port in anomaly detection models 132 illustrated in FIG. 6 is replaced with the item of target protocol. The target protocol is information which indicates the protocol of the packets associated with the model. In this manner, in anomaly detection models 133, a plurality of models are classified according to the set of the destination IP, the source IP and the target protocol.

Anomaly detection models 134 illustrated in FIG. 8 include the item of alert threshold in addition to the items of anomaly detection models 131 illustrated in FIG. 5. Although it will be described later, the alert threshold is a threshold determined, for example, in response to a user input, and is a threshold for detecting packet anomalies. The alert threshold is a threshold compared with the score calculated for the packet. In this manner, anomaly detection models 134 may be associated with the alert thresholds for detecting packet anomalies, in addition to the classification of the models.

Unlike anomaly detection models 134 illustrated in FIG. 8, the alert threshold is not necessarily required to be associated with the classification of the models.

In anomaly detection models 131 to 134 illustrated in FIG. 5 to FIG. 8, the number of models are six, but the number of models is not limited to six. The number of models may be greater than or equal to two but other than six.

FIG. 9 illustrates correspondence information in which destination ports and alert thresholds are associated with each other.

As in correspondence information 135 illustrated in FIG. 9, the alert threshold does not have to be associated with each model, but may be associated with each destination port. In other words, an alert threshold may be associated with each model according to one of anomaly detection models 131 to 133 and correspondence information 135.

Anomaly detection model DB 130 may hold one of anomaly detection models 131 to 133 and correspondence information 135 as a set, or may hold only anomaly detection models 134.

Anomaly detection model DB 130 is realized by, for example, storage 103.

Input receiving unit 140 receives an input from a user. Input receiving unit 140 receives, from the user, for example, an input indicating at least one of the IP range of the monitoring target, and the port range of the monitoring target and the range of extraction of N-grams among a plurality of packets obtained from monitoring target 300.

Here, the range of extraction of N-grams refers to, for example, the data portion, subjected to the packet inspection, indicated by the data from which N-grams are obtained in anomaly detection models 131 to 134, and is, for example, a payload corresponding to each protocol. Moreover, input receiving unit 140 receives an input of a parameter related to the alert occurrence rate for generating an alert. The alert occurrence rate is a threshold for determining, for example, that the deviation of the occurrence rate of each combination, such as one per a packets or b times per day, from a normal state is large, that is, for determining that the packet includes an anomaly. Here, input receiving unit 140 receives a plurality of the parameters each corresponding to a different one of a plurality of models. Note that input receiving unit 140 may receive one parameter which is common to a plurality of models. Input receiving unit 140 may receive an input indicating an alert threshold. The alert threshold is, for example, a threshold determined relative to the probabilities of occurrences of all the combinations for determining that the deviation of the score to be described later from a normal state is large, that is, for determining that the packet includes an anomaly.

Input receiving unit 140 is realized by, for example, CPU 101, main memory 102, storage 103, and input IF 105.

Alert threshold calculating unit 150 calculates an alert threshold based on the parameter related to the alert occurrence rate received by input receiving unit 140 and the score calculated for the learning packets. Alert threshold calculating unit 150 calculates scores for the learning packets by applying a plurality of first probabilities calculated for the learning packets to Formula 12 to be described later. Alert threshold calculating unit 150 calculates, for example, an alert threshold having the alert occurrence rate less than or equal to the alert occurrence rate designated by the parameter. When a plurality of parameters are respectively input for a plurality of models, alert threshold calculating unit 150 calculates an alert threshold based on the parameter of each model. The alert thresholds calculated by alert threshold calculating unit 150 for the models are stored as the anomaly detection models of anomaly detection model DB 130. Alert threshold calculating unit 150 is realized by, for example, CPU 101, main memory 102, and storage 103.

Detector 160 detects whether or not each of a plurality of packets obtained by obtaining unit 110 has an anomaly. Specifically, detector 160 performs processing (1) to (6) below for each of the packets obtained by obtaining unit 110.

(1) Detector 160 extracts all the possible second combinations of N data units out of a plurality of data units obtained by dividing a data sequence forming the payload included in the packet by A-bit unit. The combinations of N data units are in a successive sequential order in the payload. Here, the extracted combinations are an example of the second combinations. Specifically, detector 160 extracts combinations of N data units by using N-grams, in a similar manner to detection model learning unit 120. Here, N is, for example, two or three. In other words, detector 160 extracts combinations of two data units by using 2-grams or combinations of three data units by using 3-grams. Note that the combinations of N data units extracted by detector 160 do not have to be in the successive sequential order, but may be spaced B data unit apart (where B is an integer greater than or equal to one).

(2) Detector 160 counts a third number for each of all the possible combinations extracted from the packet. The third number is the number of occurrences of the combination in the payload included in the obtained packet.

(3) Detector 160 calculates a plurality of second probabilities based on the plurality of third numbers obtained by the counting, for the combinations extracted from the packet. The second probabilities each are the probability of occurrence of the combination in the packet.

(4) Detector 160 calculates a score by dividing the total sum of logarithms of the second probabilities calculated for the packet by a specified value specified by the payload length of the payload.

(5) Detector 160 determines whether or not the score calculated for the packet exceeds an alert threshold as a predetermined threshold that is based on the anomaly detection models stored in anomaly detection model DB 130. Detector 160 detects that the packet having the score exceeding the alert threshold has an anomaly, and that there is no anomaly in the packet having the score equal to or less than the alert threshold.

Note that in a similar manner to detection model learning unit 120, detector 160 may classify each of the packets obtained by obtaining unit 110 into any one of the models according to the header of the packet. In this case, detector 160 may determine whether or not the calculated score exceeds a predetermined threshold corresponding to the model into which the packet for which the score has been calculated is classified.

Detector 160 is realized by, for example, CPU 101, main memory 102, and storage 103.

For example, detector 160 executes inspection by performing processing as described below.

In the anomaly detection method according to the present embodiment, detector 160 calculates an anomaly score for each packet in the inspection phase, in a similar manner to PAYL and ANAGRAM. Each packet for which the anomaly score is calculated is converted into a 2-gram vector $y(\in N^{65536})$, in a similar manner to the conversion method performed in the learning phase. The converted vector is scored using the formula below.

[Math 13]

$$\text{score}' = \left( \prod_{k=0}^{65535} p(g_k)^{y[k]} \right)^{\frac{1}{L}} \quad \text{(Formula 11)}$$

where L is the payload length.

In Formula 11, L-th root is calculated so that the scores can be equally compared relative to the payloads with different lengths. Calculating this score directly leads to a heavy load as an exponential operation is required. Moreover, a packet with a greater score is treated as a packet with a higher anomaly degree. Accordingly, the negative logarithm of the above score' is treated as a score. In other words, the score is calculated by Formula 12 below.

[Math 14]

$$\text{score} = -\frac{1}{L} \sum_{k=0}^{65535} y[k] \log p(g_k) \quad \text{(Formula 12)}$$

It can be considered that the higher the value of the score is, the higher the anomaly degree is. This scoring method is more rational than the method in ANAGRAM (frequency-based), and exhibits higher performance than ANAGRAM (frequency-based) as will be understood from the evaluation results to be described later.

Presentation unit 170 outputs, for the packet detected by detector 160 as having an anomaly, an alert which is information indicating that the packet has an anomaly. Note that presentation unit 170 may output the calculated score. When presentation unit 170 presents a score, presentation unit 170 may output the score regardless of whether or not an alert is to be outputted, or may output the score without outputting an alert. Presentation unit 170 presents an alert to the user by, for example, causing display 106 to display an image indicating the alert. Presentation unit 170 is realized by, for example, CPU 101, main memory 102, storage 103, and display 106.

When anomaly detection device 100 includes a speaker, presentation unit 170 may present an alert to the user through the speaker by sound. Moreover, presentation unit 170 may cause an information terminal, such as a smart phone, to present an alert by outputting information indicating the alert to the information terminal.

[2-4 Operation]

Next, an operation of anomaly detection device 100 will be described.

Figure 10:
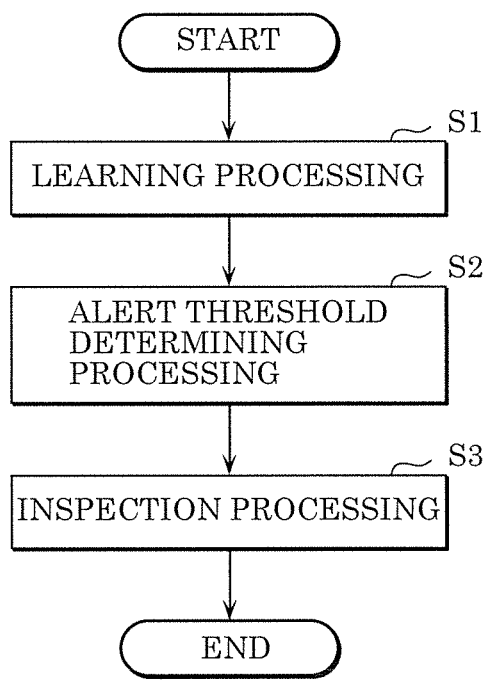
FIG. 10 is a flowchart of a schematic operation in the anomaly detection device.

FIG. 10 is a flowchart of a schematic operation in the anomaly detection device.

Anomaly detection device 100 first executes learning processing using a plurality of learning packets which are learning data 211 obtained by obtaining unit 110 (S1). Accordingly, in anomaly detection device 100, anomaly detection models are generated for respective models. The details of the learning processing will be described later.

Next, anomaly detection device 100 executes alert threshold determining processing (S2). Accordingly, in anomaly detection device 100, an alert threshold is associated with each model of anomaly detection models. The details of the alert threshold determining processing will be described later.

Finally, anomaly detection device 100 executes inspection processing using a plurality of packets which are inspection data 212 obtained by obtaining unit 110 (S3). Accordingly, anomaly detection device 100 detects whether or not an anomaly is present in each of the packets. The details of the inspection processing will be described later.

Next, learning processing, that is, the details of the learning method will be described.

Figure 11:
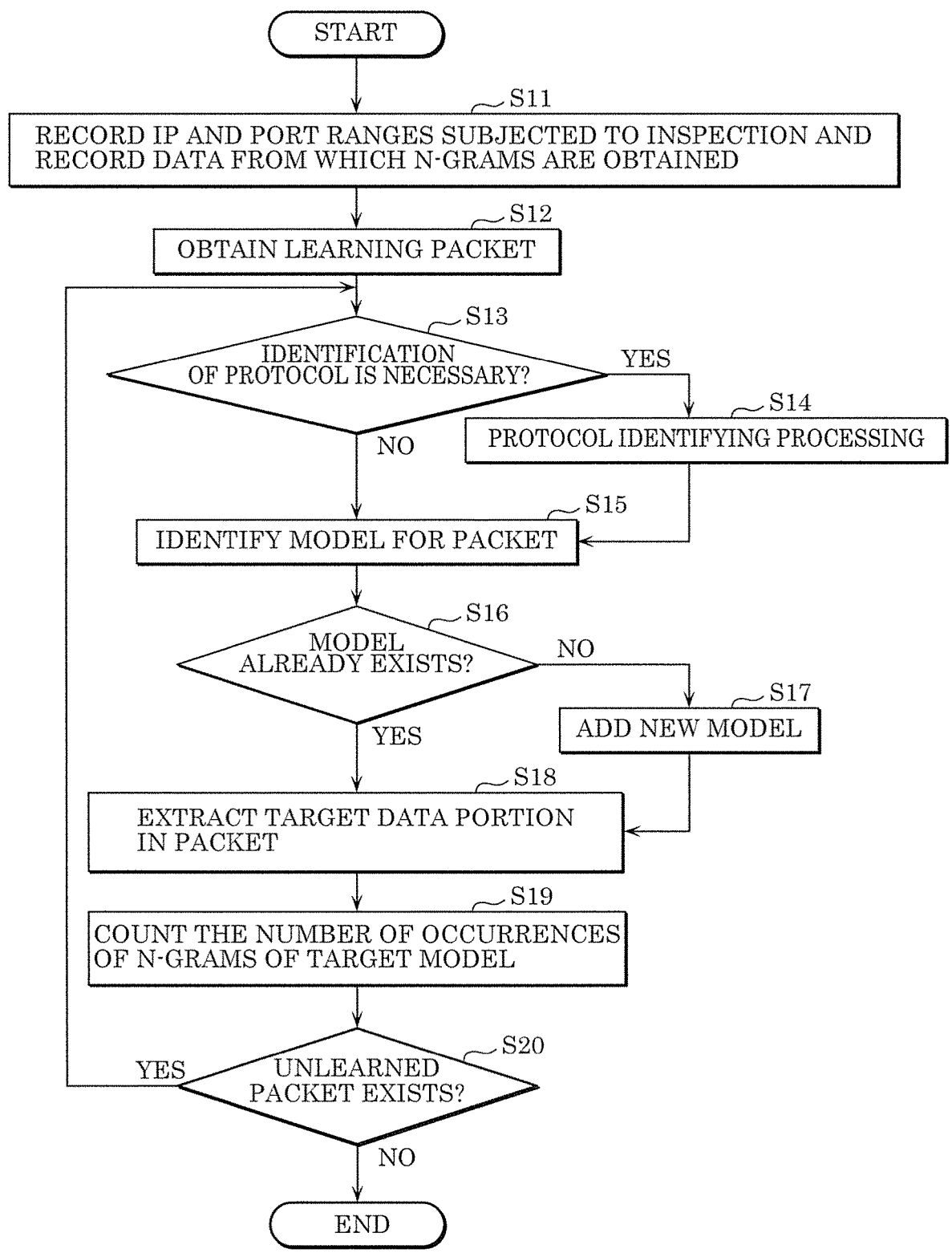
FIG. 11 is a flowchart of an example of the details of learning processing in the anomaly detection device.

FIG. 11 is a flowchart of an example of the details of the learning processing in the anomaly detection device.

First, in anomaly detection device 100, input receiving unit 140 receives an input indicating at least one of the IP range and the port range of the monitoring target and the range of extraction of N-grams, among the packets obtained from monitoring target 300 (S11). Here, input receiving unit 140 may receive, from the user, an input of information indicating whether or not identification of the protocol of the learning packets is necessary. The processing in step S11 is required to be executed only once, and it does not have to be executed every time learning is performed.

Obtaining unit 110 then obtains a plurality of learning packets which are learning data 211 (S12).

Hereinafter, detection model learning unit 120 repeats step S13 to step S20 for each of the learning packets.

Detection model learning unit 120 determines whether or not identification of the protocol of the learning packets is necessary for executing learning (S13). For example, detection model learning unit 120 determines that the identification of the protocol is necessary when input receiving unit 140 has received, in step S11, an input of information indicating that the identification of the protocol is necessary, and determines that the identification of the protocol is unnecessary when input receiving unit 140 has not received such an input in S11. The processing proceeds to step S14 when detection model learning unit 120 determines that the identification of the protocol is necessary (Yes in S13), and the processing proceeds to step S15 when detection model learning unit 120 determines that the identification of the protocol is unnecessary (No in S13).

Detection model learning unit 120 executes the protocol identification processing based on the header of the target learning packet in step S14, and the processing proceeds to step S15.

Detection model learning unit 120 identifies the appropriate model for the target learning packet in step S15. Detection model learning unit 120 identifies the model which corresponds to at least one of the destination IP, the destination port, the protocol, and the source IP obtained by reading the header of the target learning packet. Here, detection model learning unit 120 determines the classification of the model according to at least one of the IP range and the port range of the monitoring target and the range of extraction of N-grams received in step S11.

Detection model learning unit 120 determines whether or not the identified model already exists (S16). In other words, detection model learning unit 120 determines whether or not a learning packet belonging to the identified model already exists. When detection model learning unit 120 determines that the identified model has not yet exist (No in S16), the processing proceeds to step S17. When detection model learning unit 120 determines that the identified model already exists (Yes in S16), the processing proceeds to step S18.

Detection model learning unit 120 adds the identified model as a new model in step S17, and the processing proceeds to step S18.

Detection model learning unit 120 extracts the target data portion in the target learning packet in step S18. Specifically, detection model learning unit 120 extracts the target data portion, which is subjected to the inspection, associated with one of the models corresponding to the target learning packet. The target data portion is identified based on the input indicating the range of extraction of N-grams received in step S11.

Detection model learning unit 120 counts the number of occurrences of N-grams $n_1$ to $n_6$ of the model to which the target learning packet belongs (S19). Here, detection model learning unit 120 counts the fifth number as the number of occurrences of N-grams $n_1$ to $n_6$, and calculates the sixth number from the fifth number. Accordingly, detection model learning unit 120 ends the learning processing for the target packet.

Detection model learning unit 120 determines whether or not unlearned packets exist among a plurality of learning packets (S20). When the unlearned packets exist (Yes in S20), detection model learning unit 120 executes the processing in steps S13 to step S19 for the unlearned packets. When unlearned packets do not exist (No in S20), that is, when the processing in steps S13 to S19 has been completed for all the learning packets, detection model learning unit 120 ends the learning processing.

Note that obtaining unit 110 does not have to obtain a plurality of learning packets all at once, but may obtain the learning packets over a number of times. For example, obtaining unit 110 may obtain the learning packets one by one. When obtaining unit 110 obtains the learning packets over a number of times in the above manner, anomaly detection device 100 repeats the processing in steps S12 to S20.

Next, the details of the alert threshold determining processing will be described.

Figure 12:
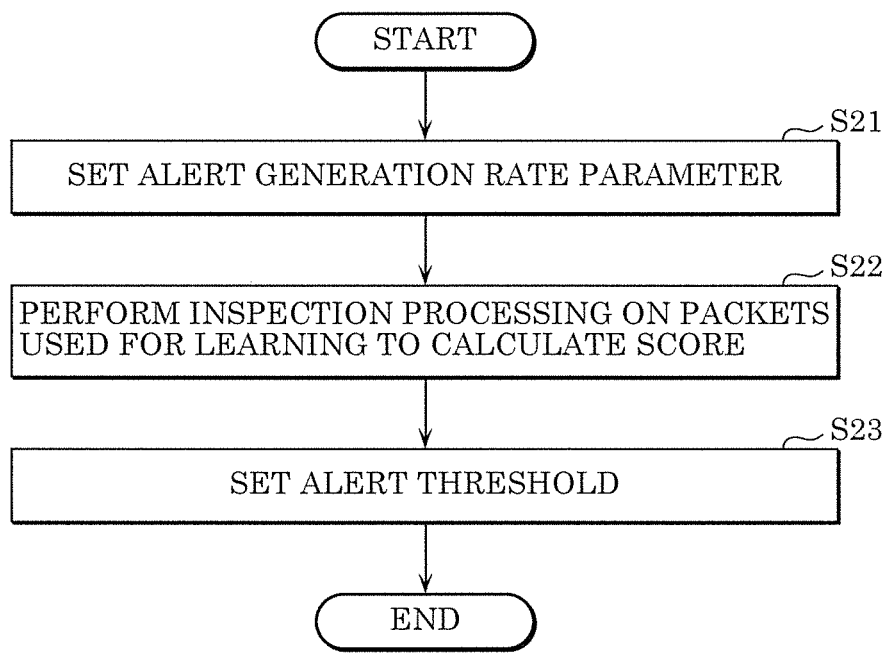
FIG. 12 is a flowchart of an example of the details of alert threshold determining processing.

FIG. 12 is a flowchart of an example of the details of the alert threshold determining processing.

In anomaly detection device 100, input receiving unit 140 receives an input of a parameter related to the alert occurrence rate for generating an alert, and sets the received parameter (S21).

Next, alert threshold calculating unit 150 calculates a score for the learning packets by applying, to Formula 12, the plurality of first probabilities calculated for the learning packets (S22).

Alert threshold calculating unit 150 then calculates an alert threshold based on the parameter related to the alert occurrence rate received by input receiving unit 140 and the score calculated for the learning packets (S23). Alert threshold calculating unit 150 calculates, for example, an alert threshold having the alert occurrence rate less than or equal to the alert occurrence rate designated by the parameter.

In the example of FIG. 12, anomaly detection device 100 calculates the alert threshold from the parameter. However, anomaly detection device 100 may receive the alert threshold directly from the user in the manner described below.

Figure 13:
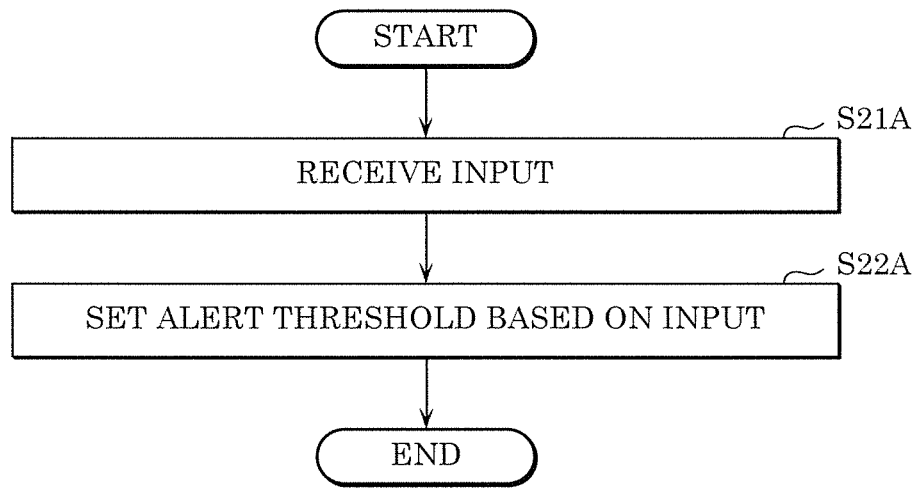
FIG. 13 is a flowchart of another example of the details of the alert threshold determining processing.

FIG. 13 is a flowchart of another example of the details of the alert threshold determining processing.

In anomaly detection device 100, input receiving unit 140 receives an input indicating an alert threshold (S21A).

Alert threshold calculating unit 150 sets, as the alert threshold, the alert threshold indicated by the input received by input receiving unit 140 (S22A).

Next, the inspection processing, that is, the details of the anomaly detection method will be described.

Figure 14:
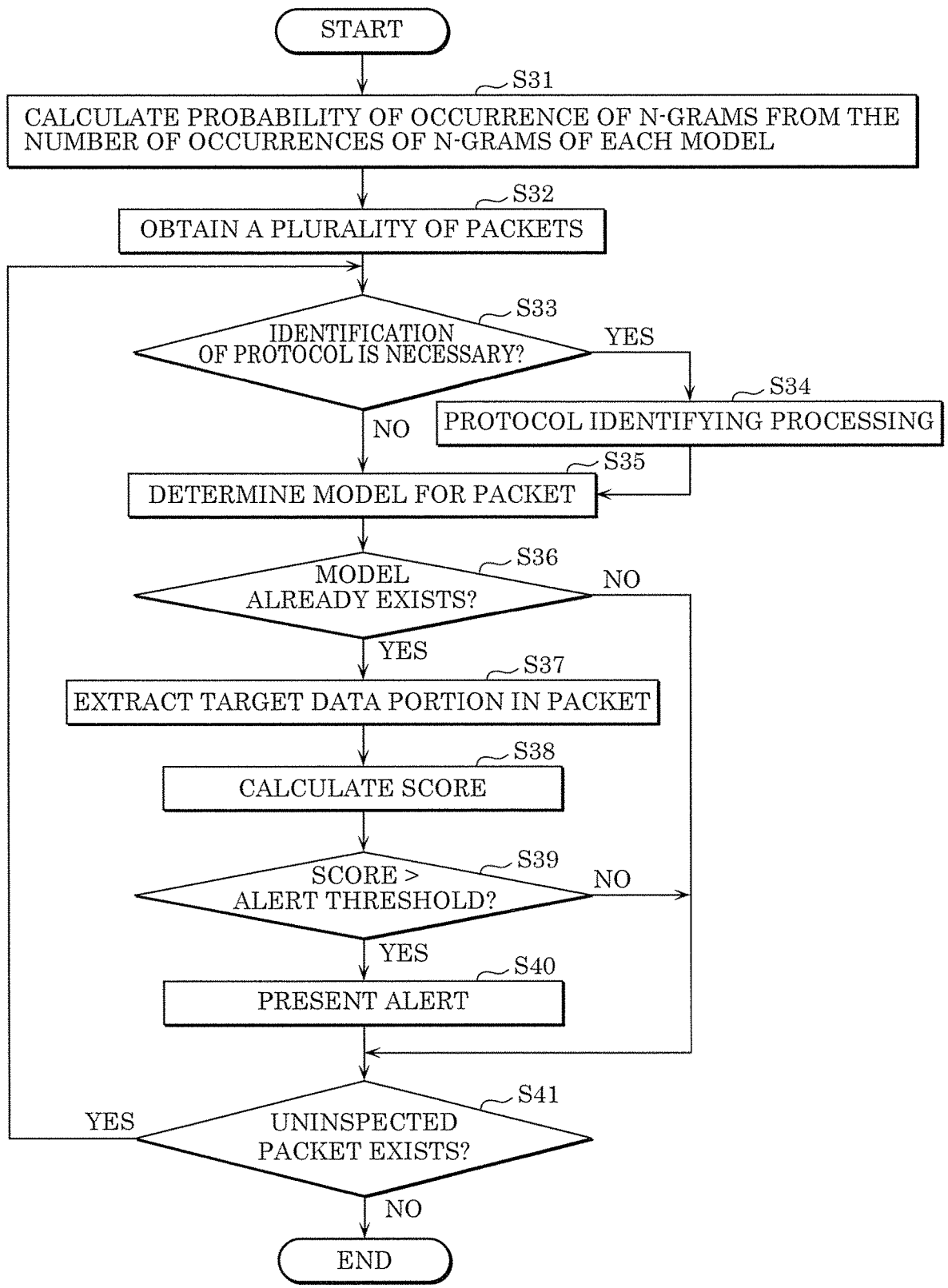
FIG. 14 is a flowchart of an example of the details of inspection processing in the anomaly detection device.

FIG. 14 is a flowchart of an example of the details of inspection processing in the anomaly detection device.

In anomaly detection device 100, detection model learning unit 120 calculates probability of occurrence of N-grams $Pr_1$ to $Pr_6$ from the number of occurrences of N-grams $n_1$ to $n_6$ of each model of the anomaly detection models (S31).

Obtaining unit 110 then obtains a plurality of packets which are inspection data 212 (S32).

Hereinafter, detector 160 repeats steps S33 to S41 for each of the packets.

Steps S33 to S36 executed by detector 160 are the same as steps S13 to S16 executed by detection model learning unit 120, and thus, the descriptions thereof are omitted.

When detector 160 determines that the identified model already exists (Yes in S36), the processing proceeds to step S37, and when detector 160 determines that the identified model has not yet exist (No in S36), the processing proceeds to step S41.

Detector 160 extracts the target data portion in the target packet in step S37. This processing is the same as step S18 in the learning processing, and thus, the description thereof is omitted.

Detector 160 calculates the score of the target packet (S38). Specifically, detector 160 calculates the score of the target packet by performing processing (1) to (6) in the above description related to detector 160.

Detector 160 determines whether or not the score calculated for the target packet exceeds the alert threshold associated with the anomaly detection model of the target packet which is stored in anomaly detection model DB 130 (S39). When detector 160 determines that the calculated score exceeds the corresponding alert threshold (Yes in S39), presentation unit 170 presents an alert (S40), and when detector 160 determines that the calculated score is less than or equal to the corresponding alert threshold (No in S39), the processing proceeds to step S41.

Detector 160 determines whether or not uninspected packets exist among a plurality of packets (S41). When the uninspected packets exist (Yes in S41), processing in step S33 to step S40 are performed on the uninspected packets. When uninspected packets do not exist (No in S41), that is, the processing in step S33 to step S40 have been completed for all the packets, detector 160 ends the inspection processing.

Note that obtaining unit 110 does not have to obtain a plurality of packets all at once, but may obtain the packets over a number of times. For example, obtaining unit 110 may obtain the packets one by one, for example. When obtaining unit 110 obtains the learning packets over a number of times in this manner, anomaly detection device 100 repeats steps S32 to S41.

[3 Advantageous Effects, etc.]

According to the anomaly detection method in the present embodiment, all possible combinations of N data units, out of a plurality of data units obtained by dividing the payload included in a packet by A bit unit, are extracted in view of the sequential order of the N data units. A second probability of occurrence of each combination is calculated and a score is calculated based on the calculated second probabilities. In this way, a score is calculated based on the probability of occurrence of the combination of N data units in the payload in view of the sequential order of N data units in the payload, and thus, an accurate score can be calculated in view of the sequential information.

Moreover, according to the learning method in the present embodiment, it is possible to additionally learn anomaly detection models, or update anomaly detection models by deleting old data. Accordingly, it is possible to accurately identify anomalous packets.

As described, it can be considered that the anomaly detection method according to the present embodiment has overcome the disadvantages in the existing methods. First, PAYL has a disadvantage in that the sequential order information of a byte sequence is ignored. In contrast, in the anomaly detection method according to the present embodiment, this disadvantage has been overcome by using the information of N-grams (N=2, 3). Moreover, in ANAGRAM, information related to the number of occurrences of N-grams is completely lost. In contrast, in the anomaly detection method according to the present embodiment, models calculated based on the number of occurrences of N-grams are used. In ANAGRAM (frequency-based), although the frequency information of N-grams is used, the score calculation method is an empirical method. In the anomaly detection method according to the present embodiment, this problem has been overcome by using Laplace smoothing and natural scoring using log likelihood.

Moreover, in the anomaly detection method according to the present disclosure, it is only necessary to hold the number of occurrences of N-gram (N=2, 3) for each model, which leads to efficient memory, and it is not necessary to estimate the size of the bloom filter unlike ANAGRAM.

Moreover, the hyperparameter in the anomaly detection method according to the present embodiment is only bottom-up parameter ß used in Laplace smoothing. This parameter may be fixed to, for example, ß=0.01. It is known that slightly varying this value empirically hardly influences the performance of the anomaly detection models.

Moreover, in the anomaly detection method according to the present embodiment, as long as vector x of the number of occurrences of 2-grams in each model is stored, it is possible to learn models in addition to the already learned models (additional learning) and to revert the learned state of data of the already learned models to the unlearned state (forgetting). In particular, the function of forgetting is not found in any other methods. By using the forgetting function, it is possible to constantly maintain a state where only one-month of data is learned, or to selectively forget, from the models, the data from the date when undesirable data was obtained as normal data. This characteristic is useful in actually managing the anomaly detection system. In other words, detector 160 may update the fourth number included in the anomaly detection model, by using the counted third number. For example, detector 160 may add learning data to the anomaly detection models by adding the third number to the fourth number. Moreover, it is possible to make the anomaly detection model to the latest state by adding the newly counted third number, and by deleting the number counted during a previous predetermined period from the fourth number of the anomaly detection model. Note that the number counted during a previous predetermined period may be deleted from the fourth number of the anomaly detection model without adding the newly counted number.

(Others)

In the above described manner, anomaly detection device 100 executes the anomaly detection method below.

1. N-grams (N≥2) are used as a feature amount because the use of unigrams completely loses information related to the sequential order in the byte sequence.

2. Information related to the number of occurrences of N-grams is used unlike ANAGRAM in which the information related to the frequency of occurrence of N-grams is completely lost.

3. Focusing on the point that the method of ANAGRAM (frequency-based) uses a simple calculation mean in the calculation of anomaly scores, probabilistic models are assumed and a method of calculating anomaly scores with more theoretical validity is used.

4. Models with less hyperparameters are used because teaching data which allows appropriate tuning of the hyperparameters is unlikely to be obtained in a real environment.

The first characteristic was made clearly because the feature of N-grams (N≥2) having information richer than unigrams can be used. This is because the reason that the accuracy of PAYL is lower than ANAGRAM is considered to be the use of unigrams.

In a similar manner, the second characteristic was made because information of how many times a given N-gram has occurred includes more information than the information of whether or not a given N-gram has occurred. Moreover, in packets of a control system network which are considered to include many binary sequences with high randomness, making determination based on only whether a given N-gram has occurred might lead to a false determination that an N-gram happened to be included in a random binary is determined as a normal sequence.

The first and second characteristics are the same as those of frequency-based ANAGRAM. However, the paper of ANAGRAM states that the frequency-based ANAGRAM is clearly inferior to binary-based ANAGRAM. As stated in the description of the third characteristic, the present disclosure has described that the method of calculating anomaly scores in the frequency-based ANAGRAM has a problem. An appropriate anomaly score calculation method can exhibit a higher level of accuracy than those of PAYL and ANAGRAM by using bigrams (N-grams when N=2).

In the anomaly detection method according to the present embodiment, too, N-gram information in payload sequences is used as a feature in a similar manner to the conventional methods using N-grams. In the present embodiment, N=2 that is 2-grams are used as a feature. The reason N which is N≥3 is not used is because when N≥3, information of each N-gram becomes sparse, which reduces the reliability of the information of the number of occurrences (this is considered to be one cause for low detection performance of ANAGRAM (frequency-based)). When sufficient data exists, even if the method according to the present disclosure is applied with N=3, a high level of accuracy is expected to be obtained. When N≥4, N-gram data becomes sparse in a realistic situation, and thus, it is considered to be unpractical.

Many of the anomaly-based detection methods have learning phases, and behaviors of normal communication are learned using data given during the learning period. In the inspection phase, whether a given packet is normal or anomalous is determined using the detection models obtained in the learning phase. The anomaly detection method according to the present embodiment is a payload-based method, but header information is also used. This is because the anomaly detection models used for learning and inspection are different according to the destination IP address and the destination port. It is because, for example, payloads to be observed are totally different between the HTTP protocol and the FTP protocol.

[4 Variation]

In the anomaly detection method according to the above embodiment, scoring can also be performed in accordance with the sequence generative models using N-grams. Here, given that $x_{i,j}[X_T, X_{T+1}]$ is the number of occurrences of 2-gram $X_T, X_{T+1}$ in the model. Here, $p(X_{T+1}|X_T)$ is defined by the following formula.

[Math 15]

$$p(X_{T+1} \mid X_T) = \frac{x_{i,j}[X_T, X_{T+1}] - \alpha}{\sum_{l=0}^{255} x_{i,j}[X_T, l] + 256\alpha} \quad \text{(Formula 13)}$$

Moreover, $p(X_1)$ is obtained separately by the following formula. Note that start is a symbol which indicates the beginning of the data.

[Math 16]

$$p(X_1 \mid \text{start}) = \frac{x_{i,j}[\text{start}, X_1] + \alpha}{\sum_{l=0}^{255} x_{i,j}[\text{start}, l] + 256\alpha} \quad \text{(Formula 14)}$$

In order to obtain this value, it is necessary to hold, for each model, the number of occurrences of the initial letter in the payload at the time of learning.

Moreover, in the inspection processing, the score can be naturally derived from Formula 4 and Formula 15.

[Math 17]

$$\text{score} = -\frac{1}{L}\left(\log(p(X_1 \mid \text{start})) + \sum_{k=0}^{L-1} \log p(X_{T+1} \mid X_T)\right) \quad \text{(Formula 15)}$$

[5 Experiment and Evaluation Results]

In the present experiment, the anomaly detection method according to the present embodiment is evaluated by comparing with PAYL, ANAGRAM (frequency-based), and ANAGRAM (binary-based) described as existing methods. In ANAGRAM (binary-based), 3-grams were evaluated, and in ANAGRAM (frequency-based), 2-grams and 3-grams were evaluated. In the anomaly detection method according to the present embodiment, 2-grams are used.

[5-1 Dataset Used in Experiment and Evaluation Method]

Here, the 1999 DARPA IDS Data Set (hereinafter, referred to as the DARPA 99 dataset) is used as dataset. The DARPA 99 dataset is a dataset collected for IDS evaluation in MIT Lincoln Labs. The DARPA 99 dataset provides all the network traffics including the payload of each packet in tcpdump format. The data consists of three-weeks of learning data and two-weeks of test data. The learning data consists of two-weeks of data with no attack and one-week of data with attacks. The test data includes attacks on all dates. Moreover, the attack data is aggregated in a unit referred to as an instance which is a collection of series of attacks. In the DARPA 99 dataset, information, such as the period during which each attack instance occurred, the target IP, and the target port of the attack instance, is disclosed. In the present evaluation experiment, in each method, learning was performed using two weeks of data with no attack data among the learning data, and anomaly scores were calculated for packets occurred in the two weeks of test data. Moreover, the methods evaluated in the experiment use N-grams of N=1, 2, 3, and thus, only packets with the payload length of 3 byte or greater were subjected to learning and test so that equal evaluation results can be obtained.

In the present experiment, in accordance with the PAYL paper, among the DARPA 99 dataset, relative to only attack instances in which the information appears in the payload, each method was evaluated for each protocol, using graphs with the instance based detection rate (vertical axis) and the packet-based false detection rate (horizontal axis). In each method, only an anomaly score (a scalar value) is calculated for each packet. Hence, whether a given packet is determined as anomalous or normal depends on a predetermined score threshold. In other words, a packet having an anomalous score exceeding the predetermined threshold is determined as anomalous and a packet having a score not exceeding the predetermined threshold is determined as normal. As the threshold increases, the false detection rate decreases, but the detection rate also decreases. On the other hand, as the threshold decreases, the detection rate increases, but the false detection rate also increases, which is a trade-off in the relationship.

(Instance-Based Detection Rate)

When one or more packets among a group of packets included in a specific attack instance are detected, it is determined that the instance is detected. The instance-based detection rate refers to the rate of the instance detected among all instances under the above determination criteria.

(Packet-Based False Detection Rate)

Among the packets determined as anomalous by the anomaly detection models, packets excluding the packets included in the attack instances are referred to as normal packets. The packet-based false detection rate refers to the rate of packets erroneously determined as anomalous among the normal packets.

The DARPA 99 data includes packets of a plurality of protocols. The number of packets or the number of attack instances in each protocol greatly vary. Accordingly, sufficient amount of data that can be used as evaluation data is considered to exist in about four types of protocols, HTTP, FTP, TELNET, and SMTP. The technique according to the present disclosure is assumed to be used in control systems. However, in the DARPA 99 data, packet data of the protocol for the control systems does not exist. Accordingly, the evaluation was conducted relative to the FTP protocol and the TELNET protocol which are considered to be relatively similar to the control commands seen in the protocol for the control system in the DARPA 99 data.

[5-2 Experimental Results]

Figure 15:
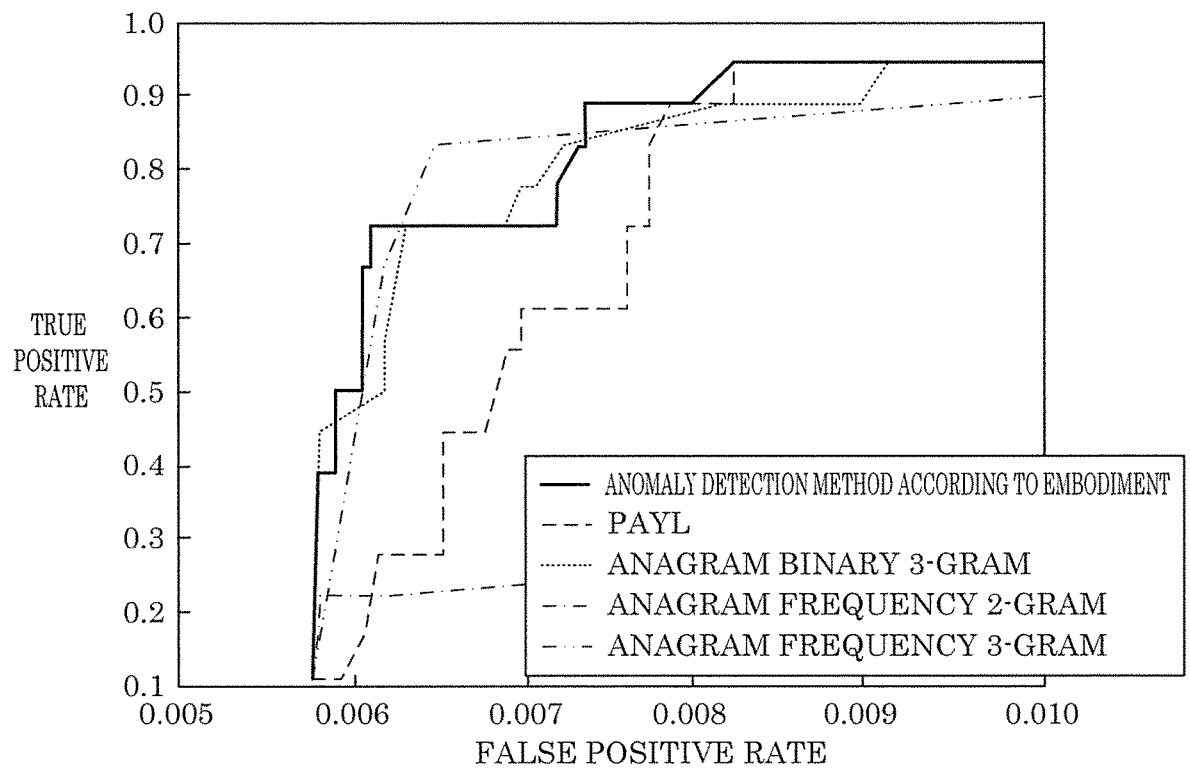
FIG. 15 illustrates experimental results in which the anomaly detection method according to the embodiment and other methods are compared when evaluations are conducted relative to FTP protocol.
Figure 16:
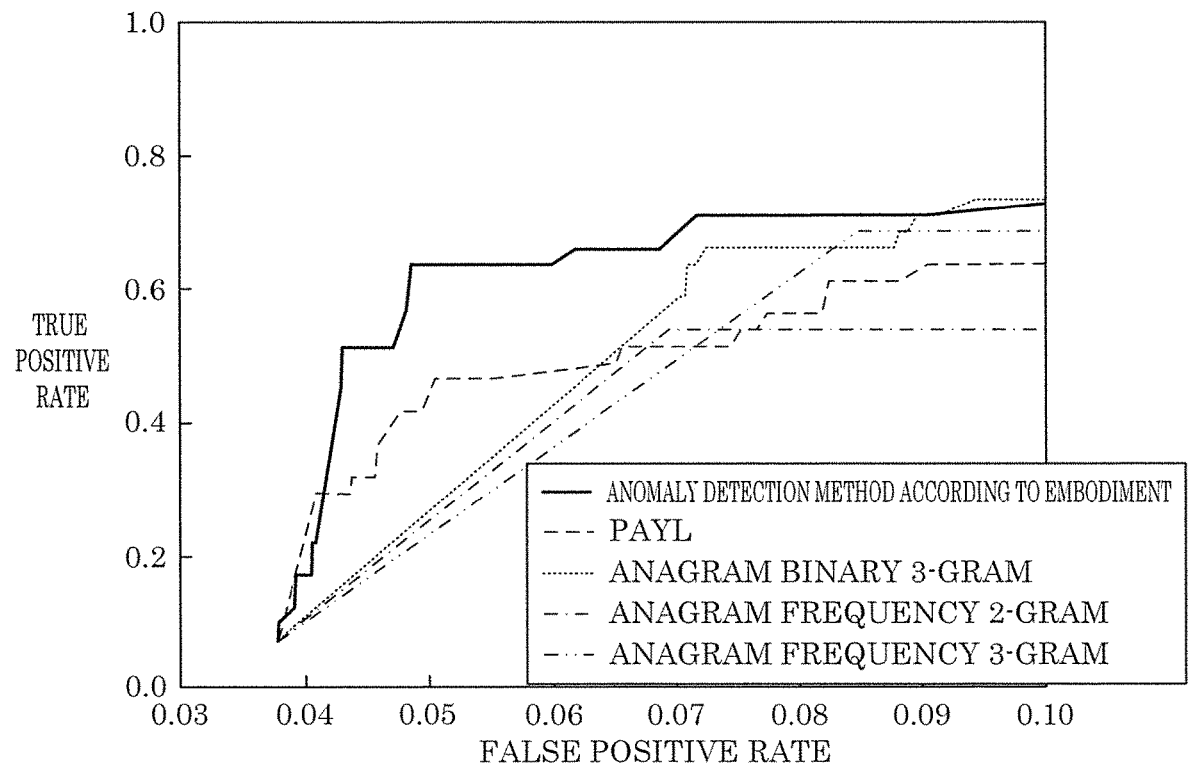
FIG. 16 illustrates experimental results in which the anomaly detection method according to the embodiment and other methods are compared when evaluations are conducted relative to TELNET protocol.

FIG. 15 illustrates experimental results in which the anomaly detection method according to the embodiment and other methods are compared when evaluations are conducted relative to the FTP protocol. FIG. 16 illustrates experimental results in which the anomaly detection method according to the embodiment and other methods are compared when evaluations are conducted relative to the TELNET protocol.

The results of the respective methods indicate increasing lines such that variations of the results are plotted increasing from smaller thresholds through to larger thresholds. As the evaluation results of the FTP protocol indicate, the anomaly detection method according to the embodiment exhibits performance equal to or higher than existing ANAGRAM (binary-based, frequency-based) which use 3-grams. The anomaly detection method according to the embodiment exhibits clearly higher performance than PAYL and ANAGRAM (frequency-based) using 2-grams. Moreover, in the evaluation results of the TELNET protocol, the anomaly detection method according to the embodiment exhibits detection performance higher than any other methods. These results show that the anomaly detection method according to the present embodiment is an algorithm which exhibits relatively good performance among the anomaly detection methods which require small amounts of tuning.

Note that each of the structural components in the above-described embodiment may be configured in the form of an exclusive hardware product, or may be realized by executing a software program suitable for the structural component. Each of the structural components may be realized by means of a program executing unit, such as a CPU and a processor, reading and executing the software program recorded on a recording medium such as a hard disk or a semiconductor memory. Here, the software program for realizing the anomaly detection method, the learning method, and the like according to the embodiment described above is the program described below.

In other words, the program causes a computer to execute the anomaly detection method executed by an anomaly detection device which detects whether or not an anomaly is present in one of a communication within a monitoring target and a communication between the monitoring target and a network to which the monitoring target is connected. The anomaly detection device includes a processor and a memory. The memory stores an anomaly detection model generated by learning using a plurality of learning packets.

The anomaly detection method includes the following executed by the processor: obtaining the plurality of learning packets; extracting, for each of the plurality of learning packets obtained, first combinations of N data units out of a plurality of data units obtained by dividing a data sequence forming a payload included in the learning packet by A bit unit, the first combinations being all possible combinations of the N data units, the N data units being in a successive sequential order in the payload or being spaced B data unit apart in the payload, N being an integer greater than or equal to two, A being an integer greater than or equal to one, B being an integer greater than or equal to one; counting a first number for each of the first combinations extracted for the plurality of learning packets, the first number being the number of occurrences of the first combination in the plurality of learning packets; calculating a plurality of first probabilities each for a different one of the first combinations extracted, based on a plurality of the first numbers obtained by the counting, the plurality of first probabilities each being a probability of an occurrence of each of the first combinations in the plurality of learning packets, the plurality of first probabilities being calculated by performing smoothing processing; storing the plurality of first probabilities calculated, in the memory as the anomaly detection model; obtaining a plurality of packets; and when a score calculated for each of the plurality of packets obtained exceeds a predetermined threshold that is based on the anomaly detection model stored in the memory, outputting information indicating that the packet having the score exceeding the predetermined threshold has an anomaly.

Moreover, the program causes the computer to execute the learning method executed by a learning device which learns an anomaly detection model for detecting whether or not an anomaly is present in one of a communication within a monitoring target and a communication between the monitoring target and a network to which the monitoring target is connected. The learning device includes a processor and a memory. The learning method includes the following executed by the processor: obtaining a plurality of learning packets; extracting, for each of the plurality of learning packets obtained, first combinations of N data units out of a plurality of data units obtained by dividing a data sequence forming a payload included in the learning packet by A bit unit, the first combinations being all possible combinations of the N data units, the N data units being in a successive sequential order in the payload or being spaced B data unit apart in the payload, N being an integer greater than or equal to two, A being an integer greater than or equal to one, B being an integer greater than or equal to one; counting a first number for each of the first combinations extracted for the plurality of learning packets, the first number being the number of occurrences of the first combination in the plurality of learning packets; calculating a plurality of first probabilities each for a different one of the first combinations extracted, based on a plurality of the first numbers obtained by the counting, the plurality of first probabilities each being a probability of an occurrence of each of the first combinations in the plurality of learning packets, the plurality of first probabilities being calculated by performing smoothing processing; and storing the plurality of first probabilities calculated, in the memory as the anomaly detection model.

Although the anomaly detection method, the anomaly detection device, the learning method, and the learning device according to one or more aspects of the present disclosure have been described based on the embodiment, the present disclosure is not limited to the embodiment. Various modifications of the embodiment as well as embodiments resulting from arbitrary combinations of structural components of different embodiments that may be conceived by those skilled in the art are intended to be included within the scope of the present disclosure as long as these do not depart from the essence of the present disclosure.

INDUSTRIAL APPLICABILITY

The present disclosure is useful, for example, as an anomaly detection method which can accurately identify anomalous packets, or as a learning method for learning anomaly detection models for the accurate identification.

What is claimed is:

1. An anomaly detection method executed by an anomaly detection device which detects whether or not an anomaly is present in one of a communication within a monitoring target and a communication between the monitoring target and a network to which the monitoring target is connected, the anomaly detection device including a processor and a memory,
the memory storing an anomaly detection model generated by learning using a plurality of learning packets,
the anomaly detection method comprising the following executed by the processor:
obtaining the plurality of learning packets;
extracting, for each of the plurality of learning packets obtained, first combinations of N data units out of a plurality of data units obtained by dividing a data sequence forming a payload included in the learning packet by A bit unit, the first combinations being all possible combinations of the N data units, the N data units being in a successive sequential order in the payload or being spaced B data unit apart in the payload, N being an integer greater than or equal to two, A being an integer greater than or equal to one, B being an integer greater than or equal to one;
counting a first number for each of the first combinations extracted for the plurality of learning packets, the first number being the number of occurrences of the first combination in the plurality of learning packets;
calculating a plurality of first probabilities each for a different one of the first combinations extracted, based on a plurality of the first numbers obtained by the counting, the plurality of first probabilities each being a probability of an occurrence of each of the first combinations in the plurality of learning packets, the plurality of first probabilities being calculated by performing smoothing processing;
storing the plurality of first probabilities calculated, in the memory as the anomaly detection model;
obtaining a plurality of packets; and
when a score calculated for each of the plurality of packets obtained exceeds a predetermined threshold that is based on the anomaly detection model stored in the memory, outputting information indicating that the packet having the score exceeding the predetermined threshold has an anomaly,
wherein, in the smoothing processing performed in the calculating of the plurality of first probabilities, a plurality of second numbers are calculated by adding a positive number to each of the plurality of first numbers, and the plurality of first probabilities are calculated based on the plurality of second numbers each calculated for a different one of the first combinations extracted.

2. The anomaly detection method according to claim 1, wherein, in the extracting, the first combinations of the N data units are extracted by using an N-gram.

3. The anomaly detection method according to claim 2, wherein N is one of two and three.

4. The anomaly detection method according to claim 1, wherein, in the outputting, for each of the plurality of packets obtained,
(i) second combinations of N data units, out of a plurality of data units obtained by dividing a data sequence forming a payload included in the packet by A bit unit, are extracted, the second combinations being all possible combinations of the N data units, the N data units being in a successive sequential order in the payload or being spaced B data unit apart in the payload,
(ii) a third number is counted for each of the second combinations extracted from the packet, the third number being the number of occurrences of the second combination in the payload included in the packet obtained,
(iii) a plurality of second probabilities are calculated based on a plurality of the third numbers obtained by the counting for the second combinations in the packet, the plurality of second probabilities each being a probability of an occurrence of the second combination in the packet,
(iv) the score is calculated by dividing a total sum of logarithms of the plurality of second probabilities calculated for the packet by a specified value specified by a payload length of the payload, and
(v) when the score calculated for the packet exceeds the predetermined threshold that is based on the anomaly detection model stored in the memory, the information is output, the information indicating that the packet having the score exceeding the predetermined threshold has an anomaly.

5. The anomaly detection method according to claim 4, wherein a fourth number based on the first number for each of the first combinations is stored in the memory as the anomaly detection model, and
the anomaly detection method further comprising
updating the fourth number included in the anomaly detection model by using the third number counted.

6. The anomaly detection method according to claim 4, further comprising:
classifying each of the plurality of learning packets obtained into any one of a plurality of models according to a header of the learning packet;
for each of the plurality of models,
(i) calculating a fifth number by using the first number counted, the fifth number being the number of occurrences of each of the first combinations in a plurality of learning packets classified into the model out of the plurality of learning packets obtained;
(ii) calculating a plurality of sixth numbers each for a different one of the first combinations extracted from the plurality of learning packets classified into the model, the plurality of sixth numbers being calculated by adding a positive number to each of a plurality of the fifth numbers calculated; and
(iii) calculating the plurality of first probabilities for the first combinations extracted, based on the plurality of sixth numbers calculated, the plurality of first probabilities each being a probability of an occurrence of each of the first combinations in the plurality of learning packets classified into the model.

7. The anomaly detection method according to claim 6, wherein the memory stores the predetermined threshold for each of the plurality of models,
the anomaly detection method further comprising
classifying each of the plurality of packets obtained into any one of the plurality of models according to a header of the packet, and
in the outputting, the information, indicating that the packet has an anomaly, is output when the score calculated exceeds the predetermined threshold corresponding to the model into which the packet for which the score has been calculated is classified.

8. The anomaly detection method according to claim 6, wherein each of the plurality of models is a model classified by at least one of a destination internet protocol (IP), a destination port, a source IP, and a protocol of the packet.

9. The anomaly detection method according to claim 6, wherein the memory stores, as the anomaly detection model, the fifth number for each of the first combinations in each of the plurality of models, and
the anomaly detection method further comprising
updating the fifth number included in the anomaly detection model by using the third number counted.

10. A learning method executed by a learning device which learns an anomaly detection model for detecting whether or not an anomaly is present in one of a communication within a monitoring target and a communication between the monitoring target and a network to which the monitoring target is connected,
the learning device including a processor and a memory,
the learning method comprising the following executed by the processor:
obtaining a plurality of learning packets;
extracting, for each of the plurality of learning packets obtained, first combinations of N data units out of a plurality of data units obtained by dividing a data sequence forming a payload included in the learning packet by A bit unit, the first combinations being all possible combinations of the N data units, the N data units being in a successive sequential order in the payload or being spaced B data unit apart in the payload, N being an integer greater than or equal to two, A being an integer greater than or equal to one, B being an integer greater than or equal to one;
counting a first number for each of the first combinations extracted for the plurality of learning packets, the first number being the number of occurrences of the first combination in the plurality of learning packets;
calculating a plurality of first probabilities each for a different one of the first combinations extracted, based on a plurality of the first numbers obtained by the counting, the plurality of first probabilities each being a probability of an occurrence of each of the first combinations in the plurality of learning packets, the plurality of first probabilities being calculated by performing smoothing processing; and
storing the plurality of first probabilities calculated, in the memory as the anomaly detection model,
wherein, in the smoothing processing performed in the calculating of the plurality of first probabilities, a plurality of second numbers are calculated by adding a positive number to each of the plurality of first numbers, and the plurality of first probabilities are calculated based on the plurality of second numbers each calculated for a different one of the first combinations extracted.

11. An anomaly detection device which detects whether or not an anomaly is present in one of a communication within a monitoring target and a communication between the monitoring target and a network to which the monitoring target is connected, the anomaly detection device comprising:
- a processor; and
- a memory which stores an anomaly detection model generated by learning using a plurality of learning packets,
- wherein the processor executes:
- obtaining the plurality of learning packets;
- extracting, for each of the plurality of learning packets obtained, first combinations of N data units out of a plurality of data units obtained by dividing a data sequence forming a payload included in the learning packet by A bit unit, the first combinations being all possible combinations of the N data units, the N data units being in a successive sequential order in the payload or being spaced B data unit apart in the payload, N being an integer greater than or equal to two, A being an integer greater than or equal to one, B being an integer greater than or equal to one;
- counting a first number for each of the first combinations extracted for the plurality of learning packets, the first number being the number of occurrences of the first combination in the plurality of learning packets;
- calculating a plurality of first probabilities each for a different one of the first combinations extracted, based on a plurality of the first numbers obtained by the counting, the plurality of first probabilities each being a probability of an occurrence of each of the first combinations in the plurality of learning packets, the plurality of first probabilities being calculated by performing smoothing processing;
- storing the plurality of first probabilities calculated, in the memory as the anomaly detection model;
- obtaining a plurality of packets; and
- when a score calculated for each of the plurality of packets obtained exceeds a predetermined threshold that is based on the anomaly detection model stored in the memory, outputting information indicating that the packet having the score exceeding the predetermined threshold has an anomaly,
- wherein, in the smoothing processing performed in the calculating of the plurality of first probabilities, a plurality of second numbers are calculated by adding a positive number to each of the plurality of first numbers, and the plurality of first probabilities are calculated based on the plurality of second numbers each calculated for a different one of the first combinations extracted.

12. A learning device which learns an anomaly detection model for detecting whether or not an anomaly is present in one of a communication within a monitoring target and a communication between the monitoring target and a network to which the monitoring target is connected, the learning device comprising:
- a processor; and
- a memory,
- wherein the processor executes:
- obtaining a plurality of learning packets;
- extracting, for each of the plurality of learning packets obtained, first combinations of N data units out of a plurality of data units obtained by dividing a data sequence forming a payload included in the learning packet by A bit unit, the first combinations being all possible combinations of the N data units, the N data units being in a successive sequential order in the payload or being spaced B data unit apart in the payload, N being an integer greater than or equal to two, A being an integer greater than or equal to one, B being an integer greater than or equal to one;
- counting a first number for each of the first combinations extracted for the plurality of learning packets, the first number being the number of occurrences of the first combination in the plurality of learning packets;
- calculating a plurality of first probabilities each for a different one of the first combinations extracted, based on a plurality of the first numbers obtained by the counting, the plurality of first probabilities each being a probability of an occurrence of each of the first combinations in the plurality of learning packets, the plurality of first probabilities being calculated by performing smoothing processing; and
- storing the plurality of first probabilities calculated, in the memory as the anomaly detection model,
- wherein, in the smoothing processing performed in the calculating of the plurality of first probabilities, a plurality of second numbers are calculated by adding a positive number to each of the plurality of first numbers, and the plurality of first probabilities are calculated based on the plurality of second numbers each calculated for a different one of the first combinations extracted.

* * * * *